(12) United States Patent
Chan et al.

(10) Patent No.: US 11,584,498 B2
(45) Date of Patent: *Feb. 21, 2023

(54) ELECTRIC ACTUATOR FOR A MARINE VESSEL

(71) Applicant: Marine Canada Acquisition Inc., Richmond (CA)

(72) Inventors: Anson Chin Pang Chan, Richmond (CA); Ian Michael Carlson, Nanaimo (CA); Ray Tat Lung Wong, Richmond (CA); Mark Isaac Dyck, Delta (CA)

(73) Assignee: Marine Canada Acquisition Inc., Richmond (CA)

( * ) Notice: Subject to any disclaimer, the term of this patent is extended or adjusted under 35 U.S.C. 154(b) by 67 days.

This patent is subject to a terminal disclaimer.

(21) Appl. No.: 17/194,907

(22) Filed: Mar. 8, 2021

(65) Prior Publication Data

US 2021/0188411 A1    Jun. 24, 2021

Related U.S. Application Data

(63) Continuation of application No. 15/978,788, filed on May 14, 2018, now Pat. No. 10,940,927.

(51) Int. Cl.
*B63H 20/12*  (2006.01)
*G05D 1/02*   (2020.01)

(52) U.S. Cl.
CPC ........... *B63H 20/12* (2013.01); *G05D 1/0206* (2013.01)

(58) Field of Classification Search
CPC .... B63H 20/08; B63H 20/12; B63H 2020/08; G05D 1/0206; B62D 5/0427

USPC ............ 440/1, 53, 61 S, 61 C, 63, 64; 114/144 R, 172; 701/21

See application file for complete search history.

(56) References Cited

U.S. PATENT DOCUMENTS

| 7,267,588 | B1 | 9/2007 | Griffiths |
| 7,364,482 | B1 | 4/2008 | Wong |
| 7,429,202 | B2 | 9/2008 | Yazaki |
| 7,467,595 | B1 | 12/2008 | Lanyi |
| 9,248,898 | B1 * | 2/2016 | Kirchhoff ............... B63B 49/00 |

(Continued)

FOREIGN PATENT DOCUMENTS

| EP | 0637537 A2 | 8/1994 |
| EP | 0921050 A1 | 6/1999 |

(Continued)

OTHER PUBLICATIONS

European Search Report dated Sep. 18, 2019 for corresponding application EP19173958.

(Continued)

*Primary Examiner* — Daniel V Venne
(74) *Attorney, Agent, or Firm* — Calderon, Safran & Cole P.C

(57) ABSTRACT

An actuator for imparting steering movement to a tiller of a propulsion unit of a marine vessel comprises an absolute position sensor operable to sense a steering position and a relative position sensor operable to sense a position of the motor. A steering control unit calibrates the relative position sensor based on a signal of the absolute position sensor. Calibration of the relative position sensor based on a signal of the absolute position sensor initializes an accumulative position which accumulates a relative position as the actuator moves over time.

20 Claims, 32 Drawing Sheets

(56) References Cited

U.S. PATENT DOCUMENTS

| | | | |
|---|---|---|---|
| 9,359,057 B1 * | 6/2016 | Andrasko | ................ B63H 5/08 |
| 9,477,253 B2 | 10/2016 | Clarke | |
| 10,227,125 B2 | 3/2019 | Clarke | |
| 10,324,468 B2 * | 6/2019 | Arbuckle | ................ B63B 79/20 |
| 10,845,812 B2 * | 11/2020 | Ward | .................... B63H 25/02 |
| 10,940,927 B2 | 3/2021 | Chan | |
| 2010/0138083 A1 | 6/2010 | Kaji | |
| 2011/0166724 A1 | 7/2011 | Hiramatsu | |
| 2017/0106959 A1 | 4/2017 | Davidson et al. | |

FOREIGN PATENT DOCUMENTS

| | | |
|---|---|---|
| EP | 3427575 B2 | 7/2003 |
| WO | WO2013123191 A1 | 8/2013 |
| WO | WO2013123208 A1 | 8/2013 |

OTHER PUBLICATIONS

European Examination Report dated Feb. 16, 2022 for corresponding application EP19173958.0.

* cited by examiner

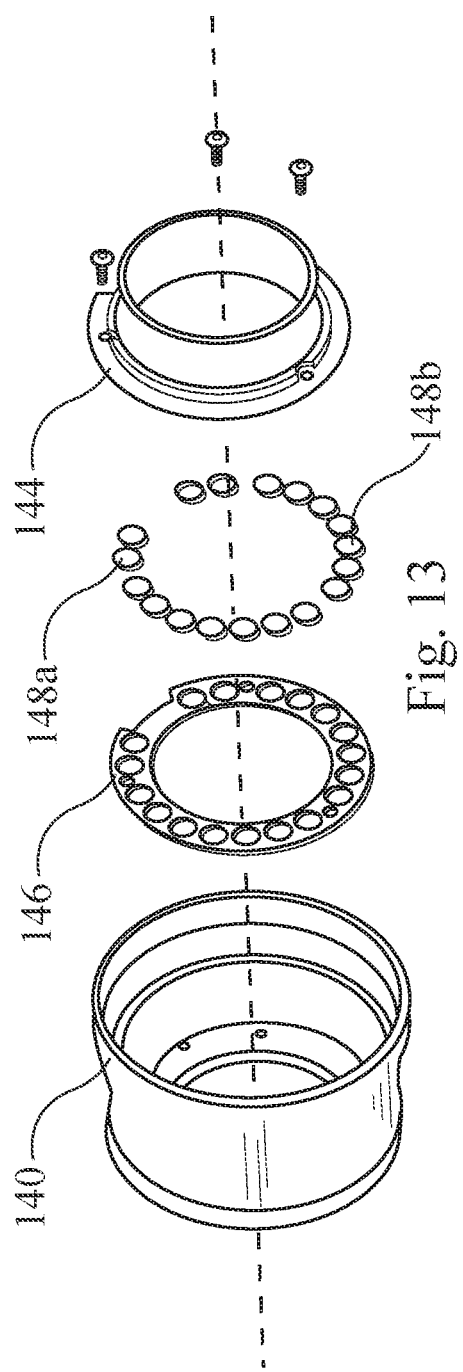

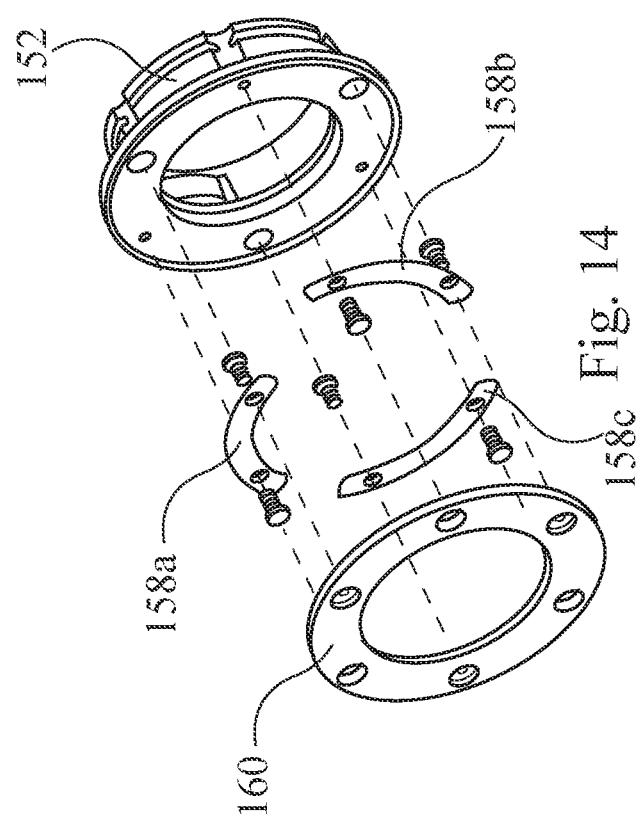

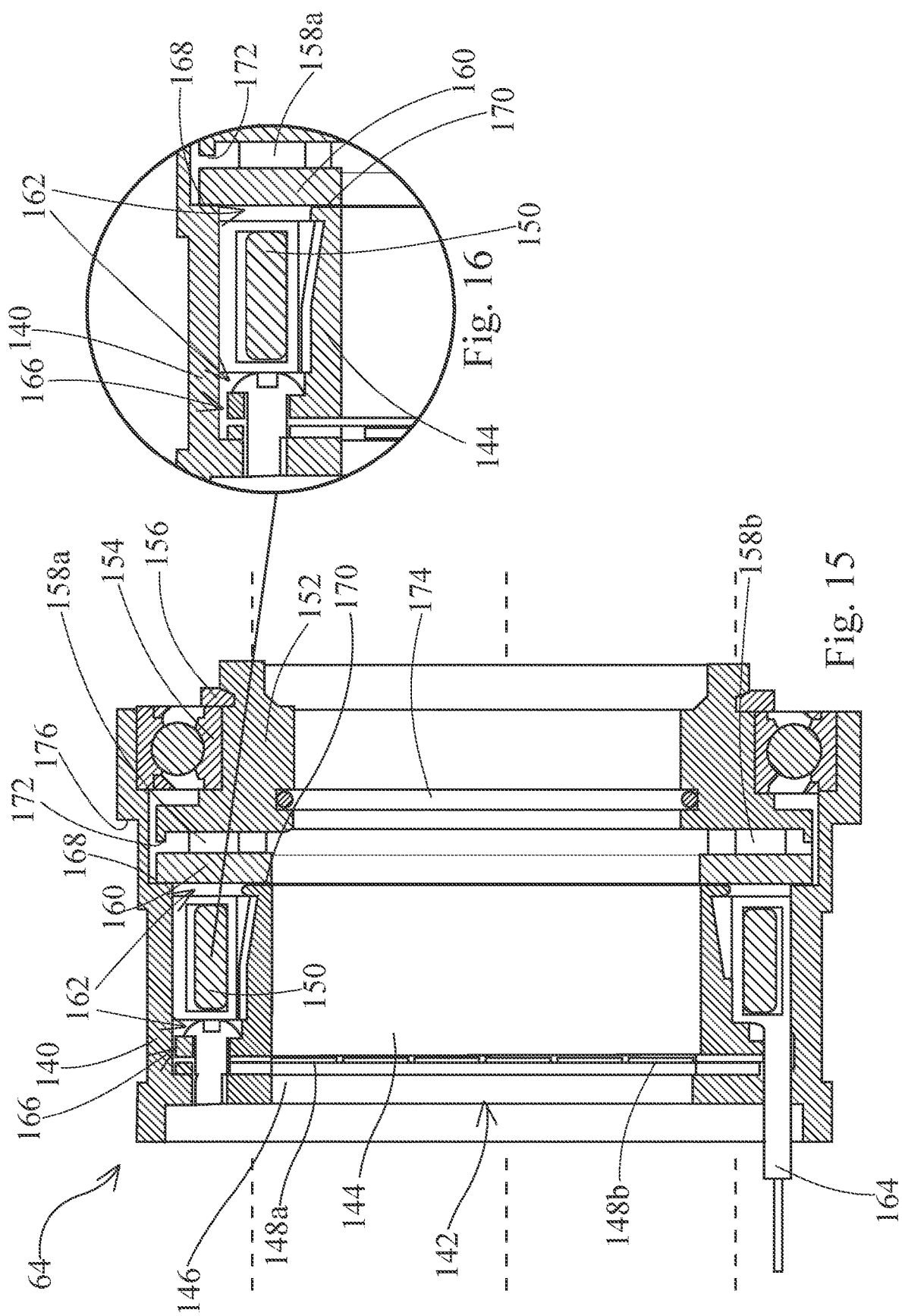

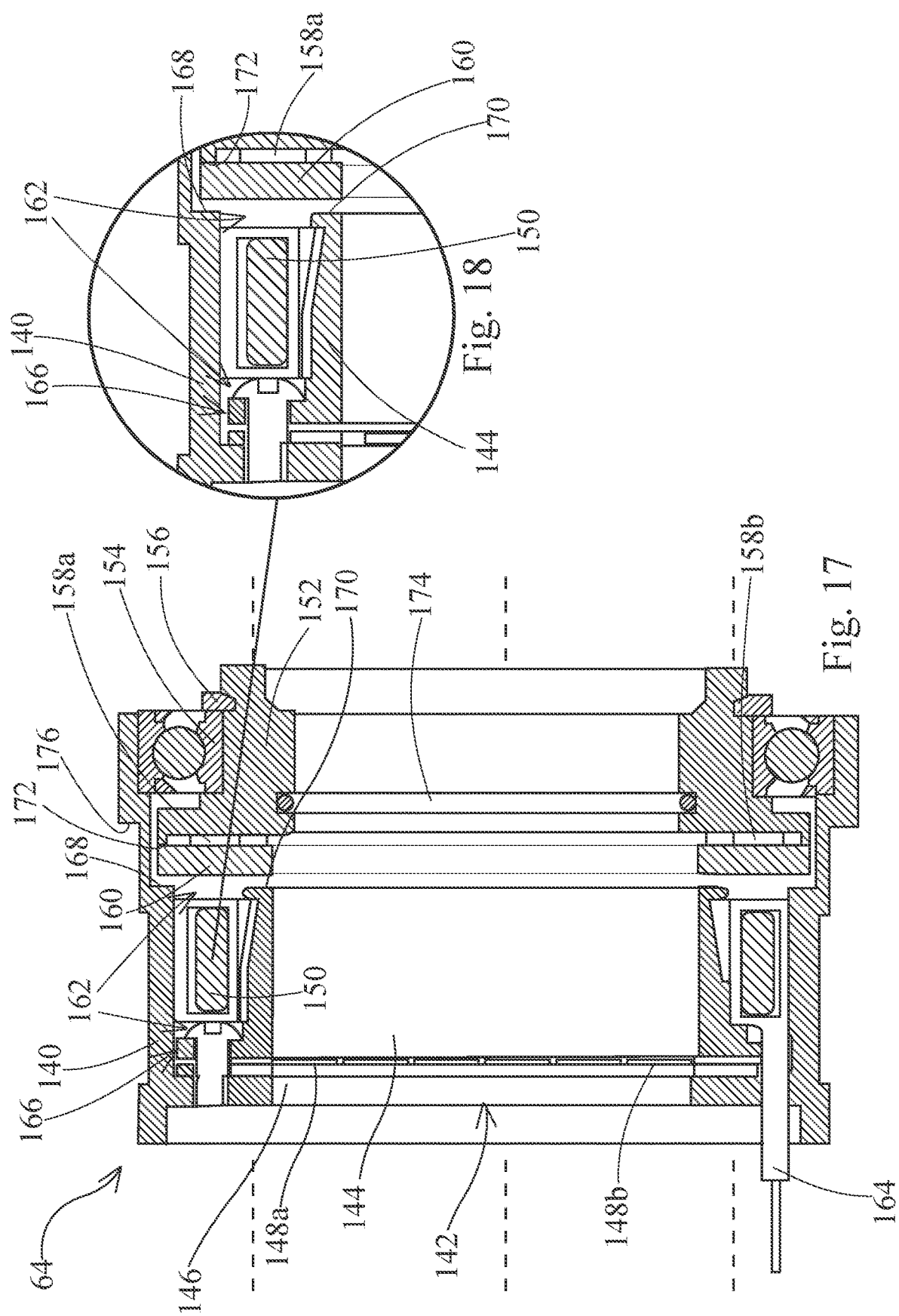

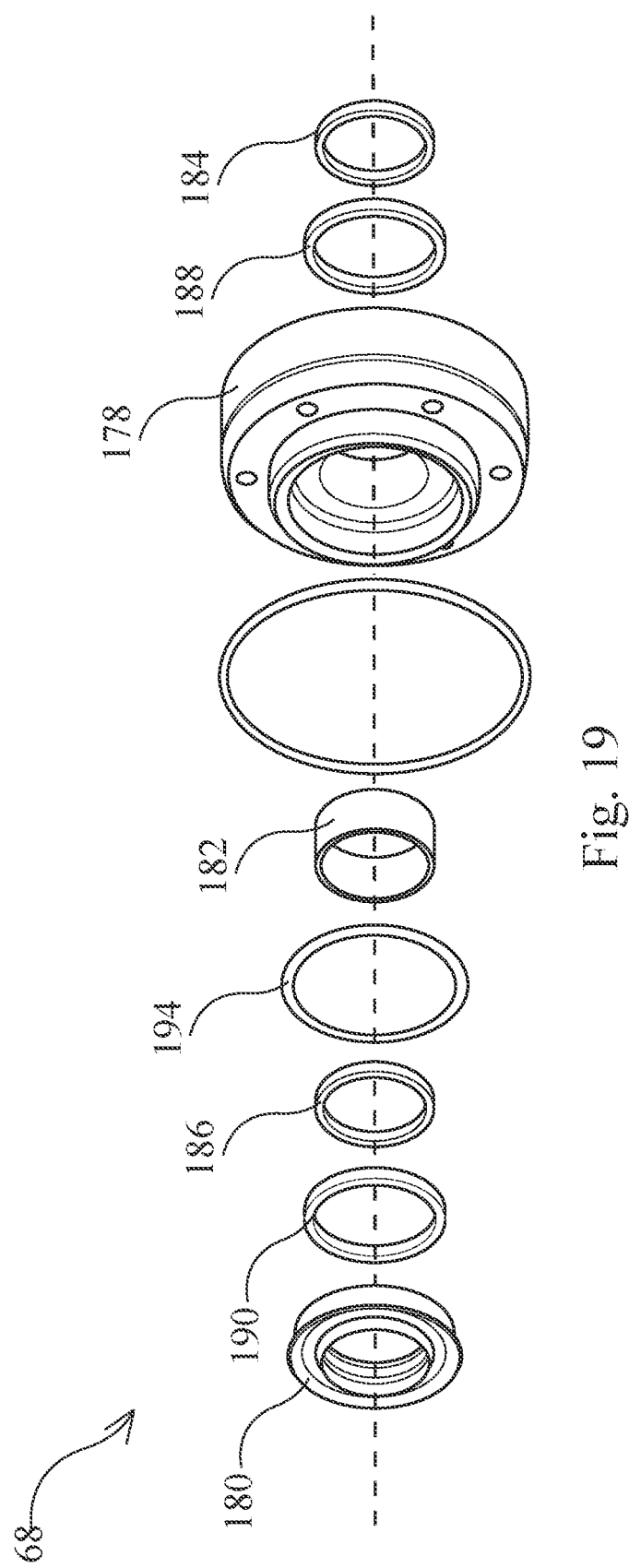

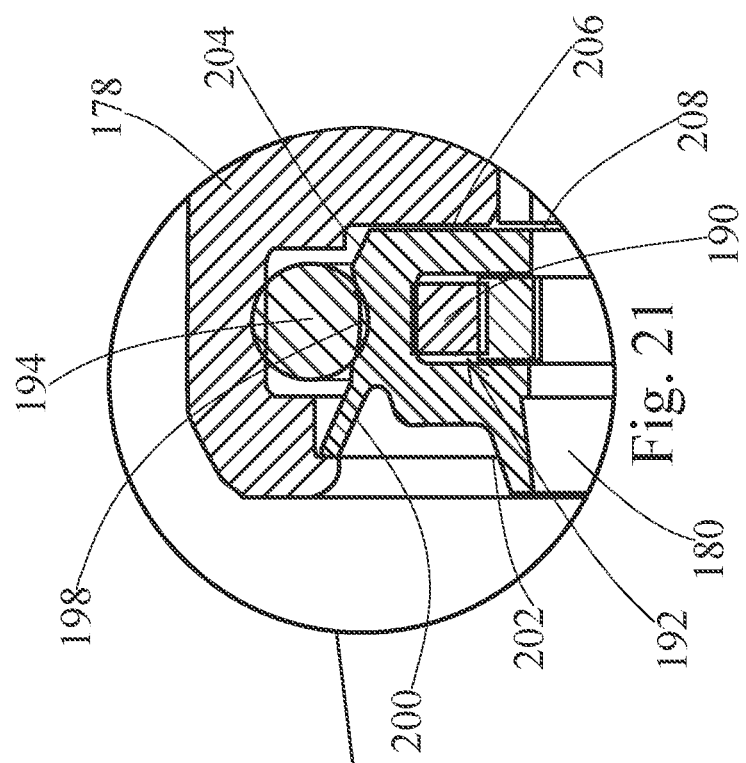
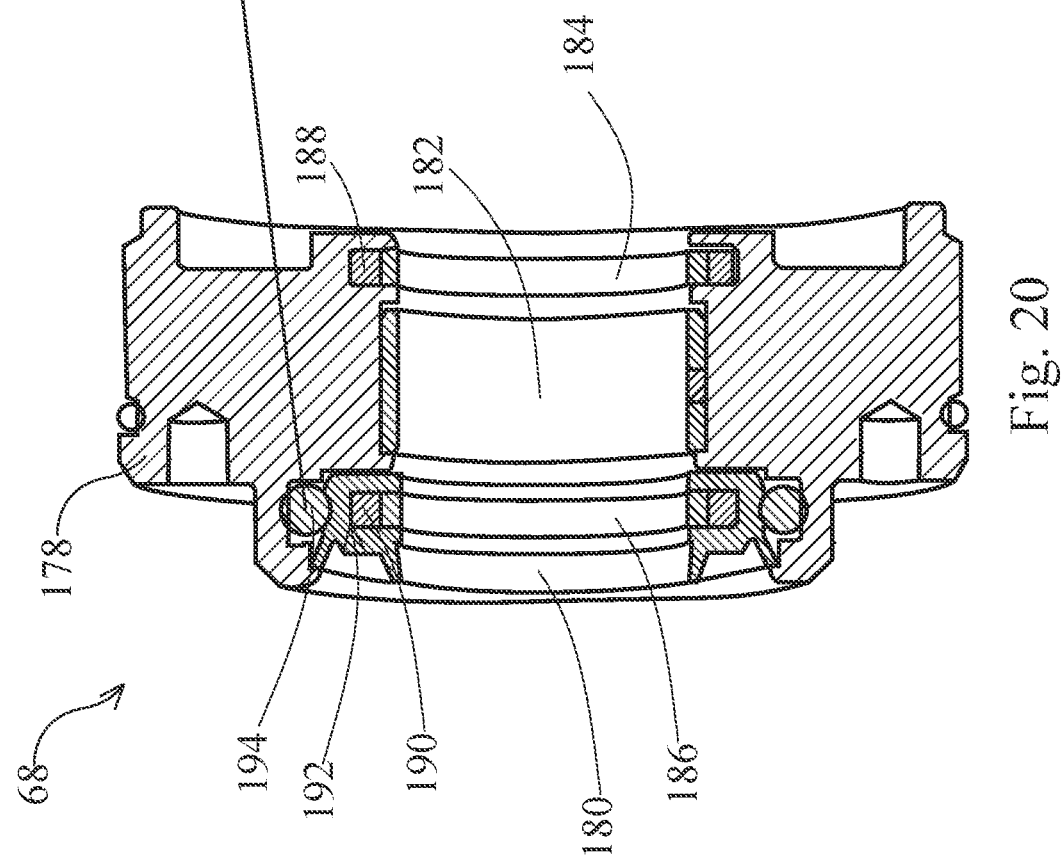

ELECTRIC ACTUATOR FOR A MARINE VESSEL

This application is a continuation of U.S. patent application Ser. No. 15/978,788, filed May 14, 2018, now U.S. Pat. No. 10,940,927, the disclosures of which are incorporated herein by reference and to which priority is claimed.

JOINT RESEARCH AGREEMENT

The invention was developed and the claimed invention was made by, or on behalf of, one or more parties to a joint research agreement that was in effect on or before the effective filing date of the claimed invention; the claimed invention was made as a result of activities undertaken within the scope of the joint research agreement; and the parties to the joint research agreement are Yamaha Motor Co., Ltd., Marine Acquisition Corp. and Marine Canada Acquisition Inc.

FIELD OF THE INVENTION

The present invention relates to an actuator and, in particular, to an actuator for a marine steering system for steering a marine vessel.

BACKGROUND OF THE INVENTION

United States Patent Application Publication No. 2017/0106959 which was published on Apr. 20, 2017, in the name of Davidson et al., discloses an electric actuator comprising a housing and an output shaft reciprocatingly received by the housing. There is a screw assembly disposed within the housing and coupled to the output shaft. The screw assembly includes a plurality of annular rollers and a central screw received by the annular rollers. The annular rollers are rotatable about the central screw. There is a motor which includes a stator and a rotor. The rotor has an inner bore which engages the annular rollers. Rotation of the rotor causes the central screw to translate axially relative to the rotor and the output shaft to reciprocate relative to the housing.

SUMMARY OF THE INVENTION

It is an object of the present invention to provide an actuator for a marine steering system for steering a marine vessel.

There is accordingly provided an actuator for imparting steering movement to a tiller of a propulsion unit of a marine vessel. The electric actuator comprises a housing and an output shaft reciprocatingly received by the housing. There is a motor which causes the output shaft to reciprocate relative to the housing. An absolute position sensor senses a steering position and a relative position sensor senses a position of the motor. A steering control unit calibrates the relative position sensor based on a signal of the absolute position sensor. Calibration of the relative position sensor based on a signal of the absolute sensor initializes an accumulative position which accumulates a relative position as the actuator moves over time.

The steering control unit may compare a signal of the absolute position sensor and the accumulative position for fault detection. The steering control unit may initialize the accumulative position of the relative position sensor with the absolute position sensor when the actuator is started-up. The steering control unit may monitor the accumulative position and the steering position during a change in steering direction to determine backlash. The steering control unit may monitor backlash during initial steering movement and compensate for backlash by reinitializing the accumulative position. The steering control unit may restrict a steering range of the actuator after initialization of the accumulative position and before compensating for backlash. The steering control unit may use the accumulative position for position control of the actuator. The steering control unit may use a redundant sensor for position control of the actuator if the absolute position sensor or the relative position sensor fails.

There is also provided an actuator for imparting steering movement to a tiller of a propulsion unit of a marine vessel. The actuator comprises a housing and an output shaft reciprocatingly received by the housing. There is a motor disposed within the housing. The motor has a rotor and a stator. The rotor has a magnetic field and the stator has a magnetic field. Rotation of the rotor causes the output shaft to translate axially relative to the rotor and causes the output shaft to reciprocate relative to the housing. There is a sensor for sensing a position of the rotor. A steering control unit energizes the stator to align the magnetic field of the stator with the magnetic field of the rotor based on a position of the rotor sensed by the sensor for sensing the position of the rotor to hold a position of the rotor. The motor may be at least a two-phase motor and the steering control unit may energize the stator by applying a PWM to generate a magnetic field that aligns with and holds the positon of the rotor. The steering control unit may apply a minimum PWM to create a holding torque which counters a back driving torque as a function of at least one of marine vessel speed, engine RPM and steering position. The steering control unit may increase or decrease the minimum PWM applied in order to counter the back driving torque. The steering control unit may determine a magnitude and rate of PWM increase based on a signal from a position sensor sensing back driving. The steering control unit may determine a magnitude and rate of PWM increase based on a signal from a torque sensor sensing back driving torque.

There is further provided a marine steering system comprising a propulsion unit having a tiller and an actuator for imparting steering movement to the tiller of the propulsion unit. The actuator includes a housing and an output shaft reciprocatingly received by the housing. A motor causes the output shaft to reciprocate relative to the housing. A power source supplies electric power to the motor and a sensor senses a capacity of the power source. A steering control unit limits the maximum electric power supplied to the motor by controlling the voltage to the motor relative to the capacity of the power source. The steering control unit may limit the maximum electric power supplied to the motor by increasing or decreasing PWM based on whether the PWM is in a first zone, a second zone, or a third zone. The steering control unit may decreases PWM when the PWM is in the first zone. The steering control unit may increase or decrease PWM when the PWM is in the second zone. The steering control unit may prevent increasing PWM when the PWM is in the third zone.

There is further provided a marine steering system comprising a first propulsion unit and a second propulsion unit. The first propulsion unit has a tiller, an actuator for imparting steering movement to the tiller of the first propulsion unit, and a position sensor for sensing a steering position of the first propulsion unit. The second propulsion unit has a tiller and an actuator for imparting steering movement to the tiller of the second propulsion unit, and a position sensor for sensing a steering position of the second propulsion unit. A steering control unit controls the actuator of the first propulsion unit to impart steering movement to the first propulsion unit based on relative steering positions of the first propulsion unit and the second propulsion unit. The steering control unit controls the actuator of the first propulsion unit by slowing down steering movement of the first propulsion unit relative to the steering position of the second propulsion unit.

The steering control unit may control the actuator of the first propulsion unit to impart steering movement to the first propulsion unit based on an engine target rudder angle position scheduler. The steering control unit may control the actuator of the first propulsion unit to pause steering movement to the first propulsion unit based on relative steering positions of the first propulsion unit and the second propulsion unit. The steering control unit may control the actuator of the first propulsion unit to impart steering movement to the first propulsion unit in one of a first state in which the actuator is allowed to operate up to a maximum speed, a second state in which the actuator is allowed to operate up to a maximum speed limit determined by a reduce speed curve, and a third state in which the actuator is prevented from moving further in a first direction. The steering control unit may control the actuator of the first propulsion unit to impart steering movement of the first propulsion unit based on a direction of the steering movement. The steering control unit may control the actuator of the first propulsion unit to impart steering movement of the first propulsion when the first propulsion unit is moving towards the second propulsion unit. The transition between said states is based on the relative steering positions of the first propulsion unit and the second propulsion unit.

There is still further provided a marine steering system comprising a first propulsion unit and a second propulsion unit. The first propulsion unit has a tiller, an actuator for imparting steering movement to the tiller of the propulsion unit, and a position sensor for sensing a steering position of the first propulsion unit. The second propulsion unit has a tiller and an actuator for imparting steering movement to the tiller of the second propulsion unit, and a position sensor for sensing a steering position of the second propulsion unit. There is a device for setting a toe angle between the first propulsion unit and the second propulsion unit. A steering control unit receiving a steering position command, wherein the steering control unit may modify the toe angle based on the steering position command. The steering control unit modifies the toe angle and an engine target rudder angle for each of the first propulsion unit and the second propulsion unit based on the toe angle. The engine target rudder angle may be dependent on a vessel target rudder angle.

BRIEF DESCRIPTIONS OF DRAWINGS

The invention will be more readily understood from the following description of the embodiments thereof given, by way of example only, with reference to the accompanying drawings, in which:

FIG. 13 is a fragmentary, exploded perspective view of the brake of the electric actuator of FIGS. 2 and 3;

FIG. 14 is another fragmentary, exploded perspective view of the brake of the electric actuator of FIGS. 2 and 3;

FIG. 15 is a partially sectional, elevation view of the brake for the electric actuator of FIGS. 2 and 3 in an engaged position;

FIG. 16 is an enlarged view of an air gap of the brake taken from FIG. 15;

FIG. 17 is a partially sectional, elevation view of the brake for the electric actuator of FIGS. 2 and 3 in a released position;

FIG. 18 is an enlarged view of the air gap of the brake taken from FIG. 17;

FIG. 19 is an exploded perspective view of an end gland for the electric actuator of FIGS. 2 and 3;

FIG. 20 is a partially sectional, elevation view of the end gland for the electric actuator of FIGS. 2 and 3;

FIG. 21 is an enlarged view of a portion of a floating seal housing of the end gland taken from FIG. 20;

DESCRIPTIONS OF THE PREFERRED EMBODIMENT(S)

Figure 1:
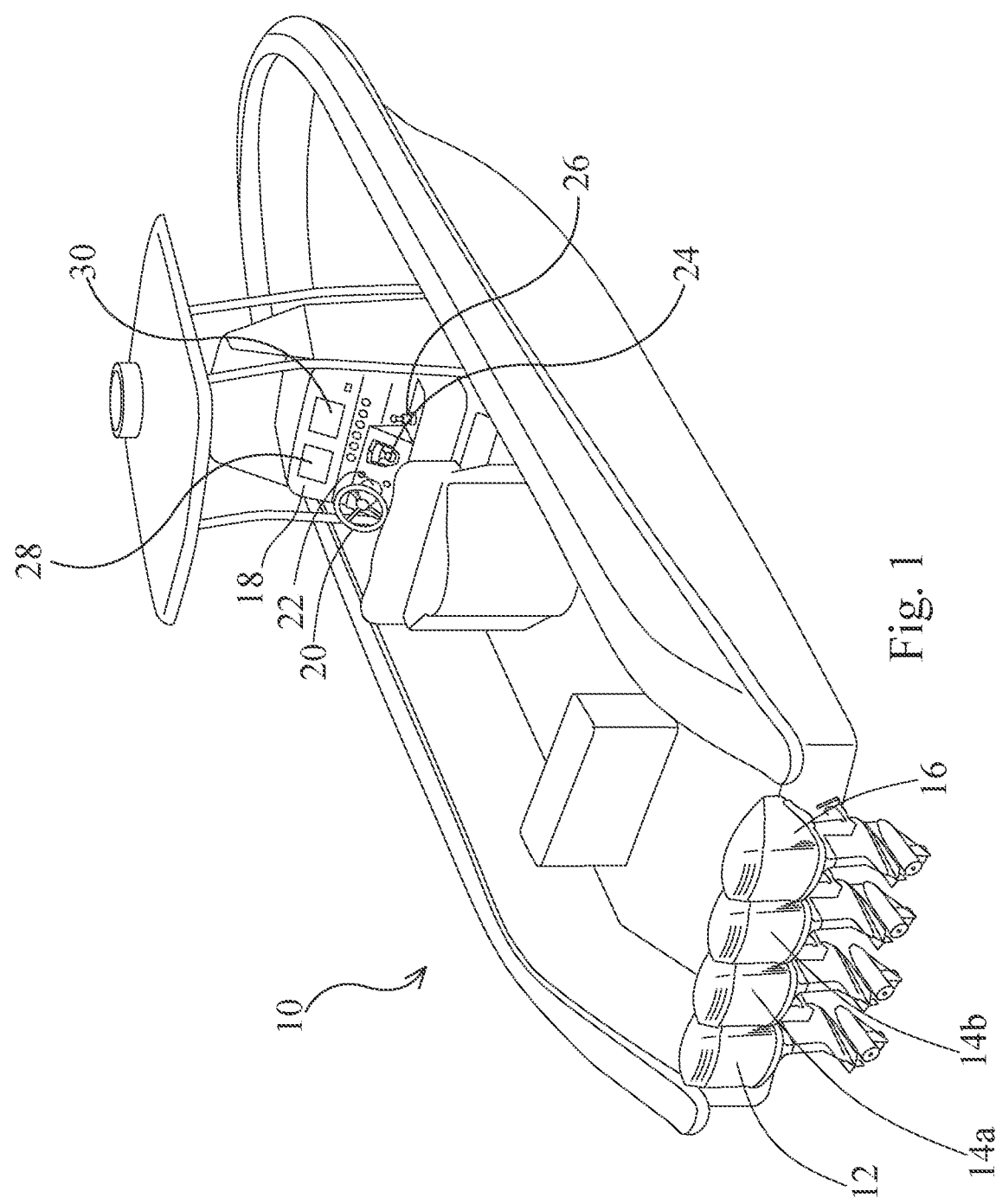
FIG. 1 is a perspective view of a marine vessel provided with a plurality of propulsion units each having an electric actuator.

Referring to the drawings and first to FIG. 1, there is shown a marine vessel 10 which is provided with a plurality of propulsion units which, in this example, are in the form of four outboard engines, namely, a port engine 12, a port center engine 14a, a starboard center engine 14b, and a starboard engine 16. However, the propulsion units may be any number or form of propulsion units in other examples. The marine vessel 10 is also provided with a control station 18 that supports a steering wheel 20 mounted on a helm 22, a control head 24, and a joystick 26. The control station 18 is conventional and allows the port engine 12, the port center engine 14a, the starboard center engine 14b, and the starboard engine 16 to be steered using either the steering wheel 20 and the helm 22 or the joystick 26 as disclosed in PCT International Application Publication Number WO 2013/1123208 A1 which is incorporated herein by reference. The control station 18 further includes a first display interface 28 and a second display interface 30. In this example, the first display interface is a display interface which displays navigational information and the second display interface is a display interface which displays onboard system information.

Figure 2:
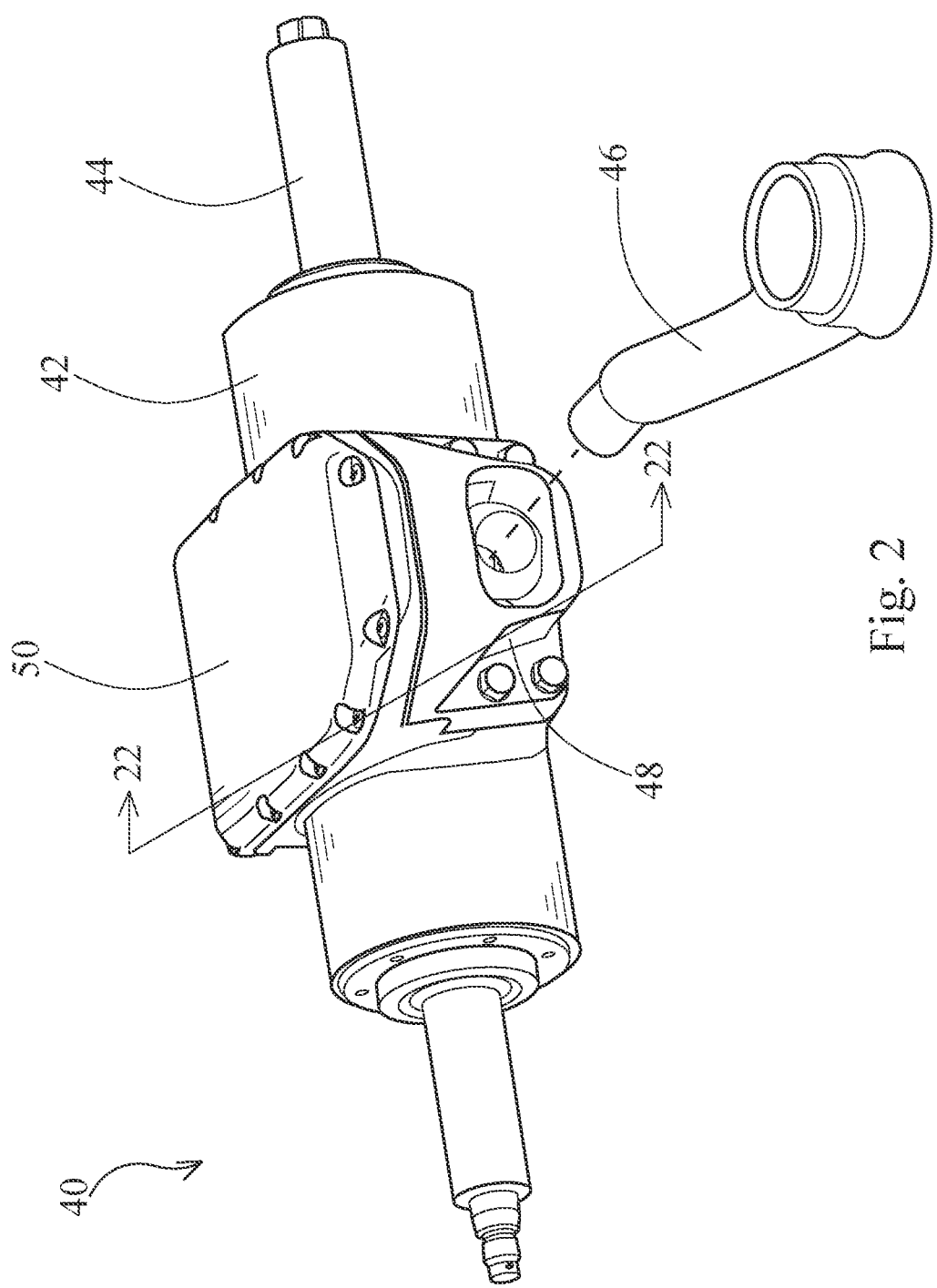
FIG. 2 is a perspective view of a first side of an electric actuator of one of the propulsion units of FIG. 1.
Figure 3:
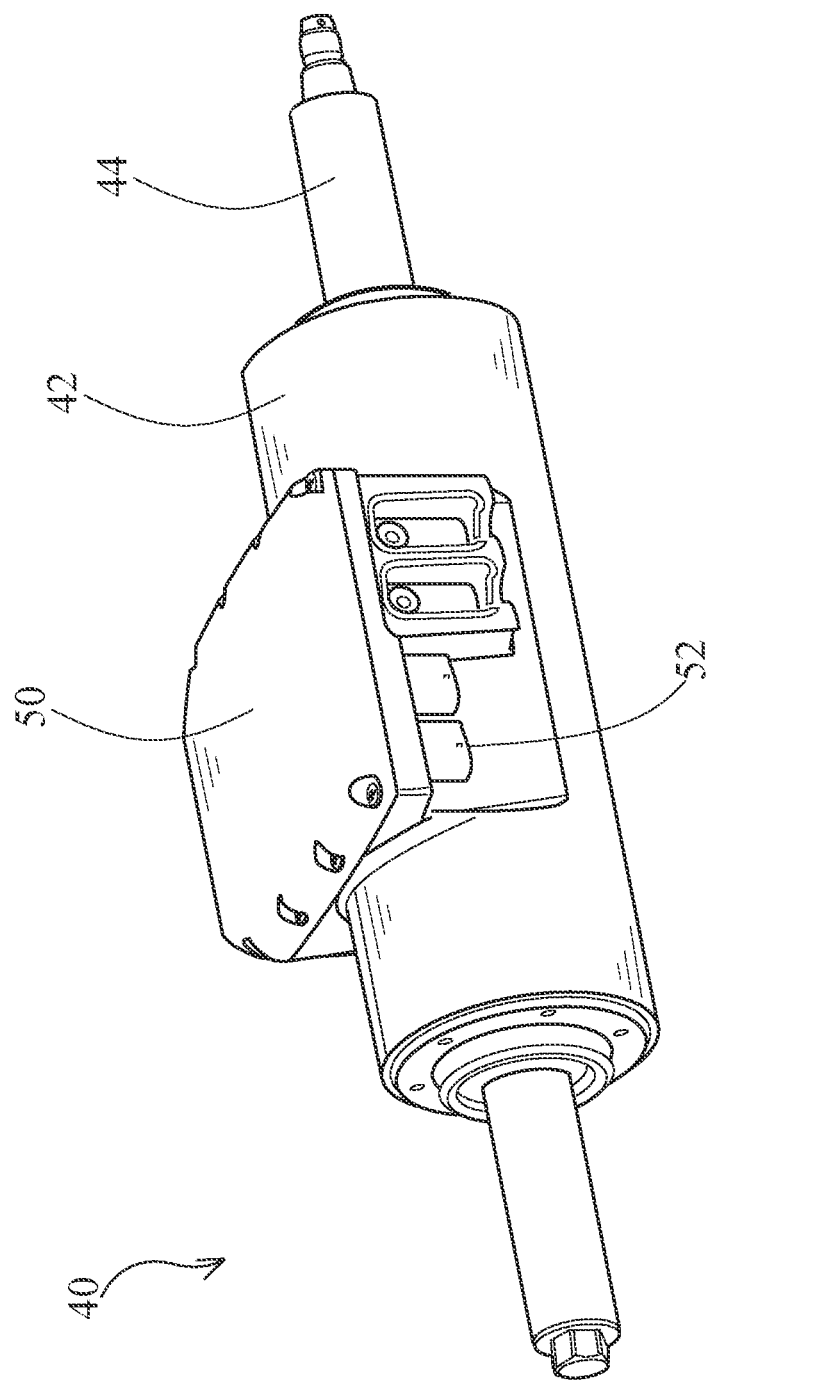
FIG. 3 is a perspective view of a second side of the electric actuator of one of the propulsion units of FIG. 1.

Each of the port engine 12, the port center engine 14a, the starboard center engine 14b, and the starboard engine 16 is provided with an electric actuator which steers each engine. FIGS. 2 and 3 show an electric actuator 40 of the port engine 12. It will be understood by a person skilled in the art that the electric actuators for the port center engine 14a, the starboard center engine 14b, and the starboard engine 16 are substantially identical in structure and function to the electric actuator 40 for the port engine 12. The electric actuators for the port center engine 14a, the starboard center engine 14b, and the starboard engine 16 are accordingly not described in detail herein. The electric actuator 40 includes a housing 42 as well as an output shaft 44 which is reciprocatingly received by the housing 42. It will be understood by a person skilled in the art that, when the electric actuator 40 is mounted on the port engine 12, axial movement of the output shaft 44 is inhibited relative to the marine vessel 10 while the housing 42 reciprocates linearly along the output shaft 44 and relative to the marine vessel 10. This relative linear movement of the housing 42 imparts a steering force to a tiller 46 of the port engine 12 and thereby causes the port engine 12 to be steering in a conventional manner.

There is a coupling assembly 48 mounted on the housing 42. The coupling assembly 48 is a ball joint assembly, in this example, and allows the housing 42 to be coupled to the tiller 46 of the port engine 12. There is also a steering control unit 50 mounted on the housing 42. The steering control unit 50 is accordingly integral with the electric actuator 40 as opposed to being elsewhere on the marine vessel 10 as is conventional. There are inputs, for example input 52, which allow the steering control unit 50 to be in communication with the control station of the marine vessel 10. Making the steering control unit 50 integral with the electric actuator 40 simplifies wiring, by eliminating the need for a number of wires/harnesses required in conventional systems, and reduces voltage drop between the steering control unit and the actuator.

Figure 4:
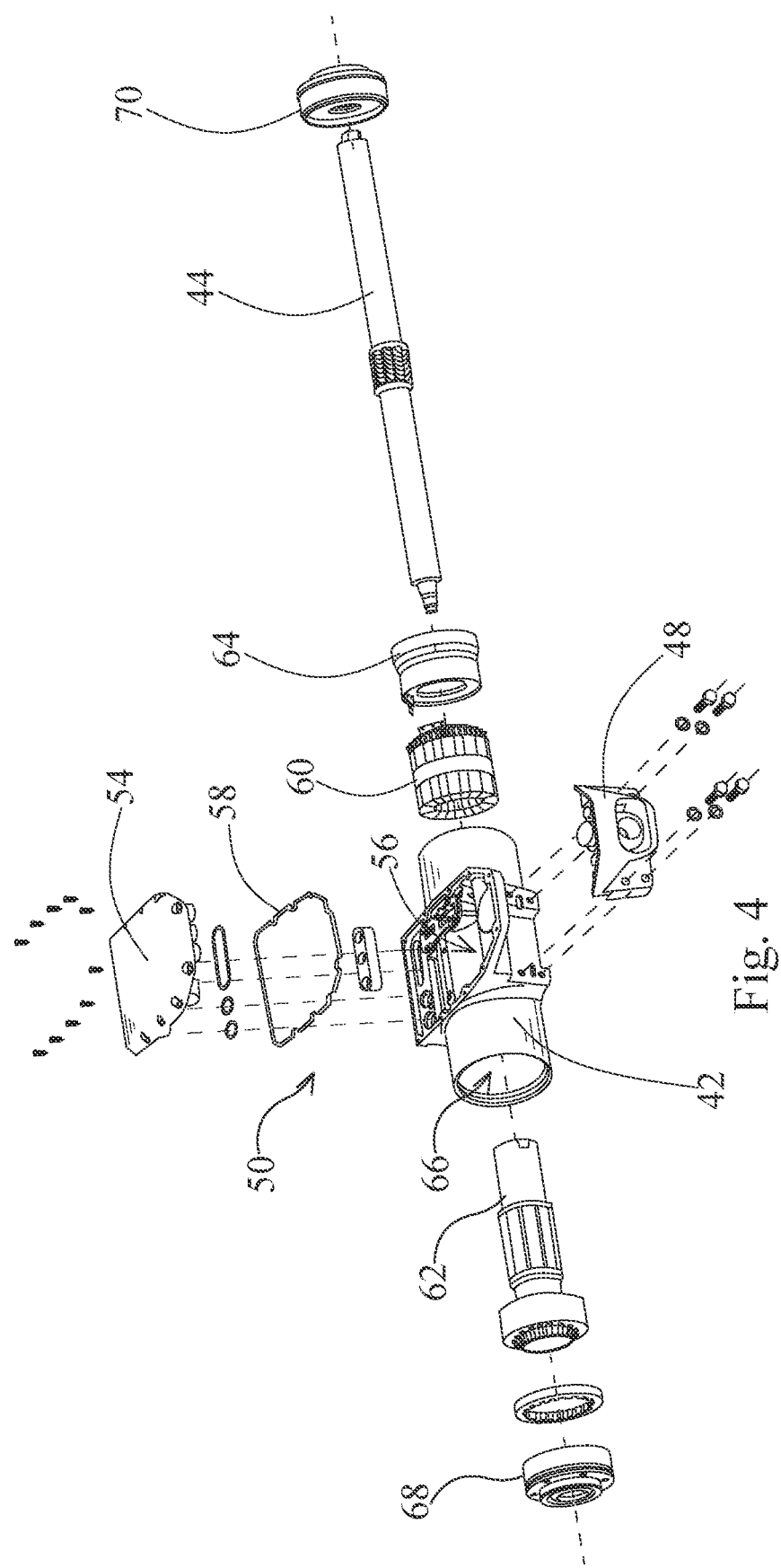
FIG. 4 is an exploded, perspective view of the electric actuator of FIGS. 2 and 3.
Figure 5:
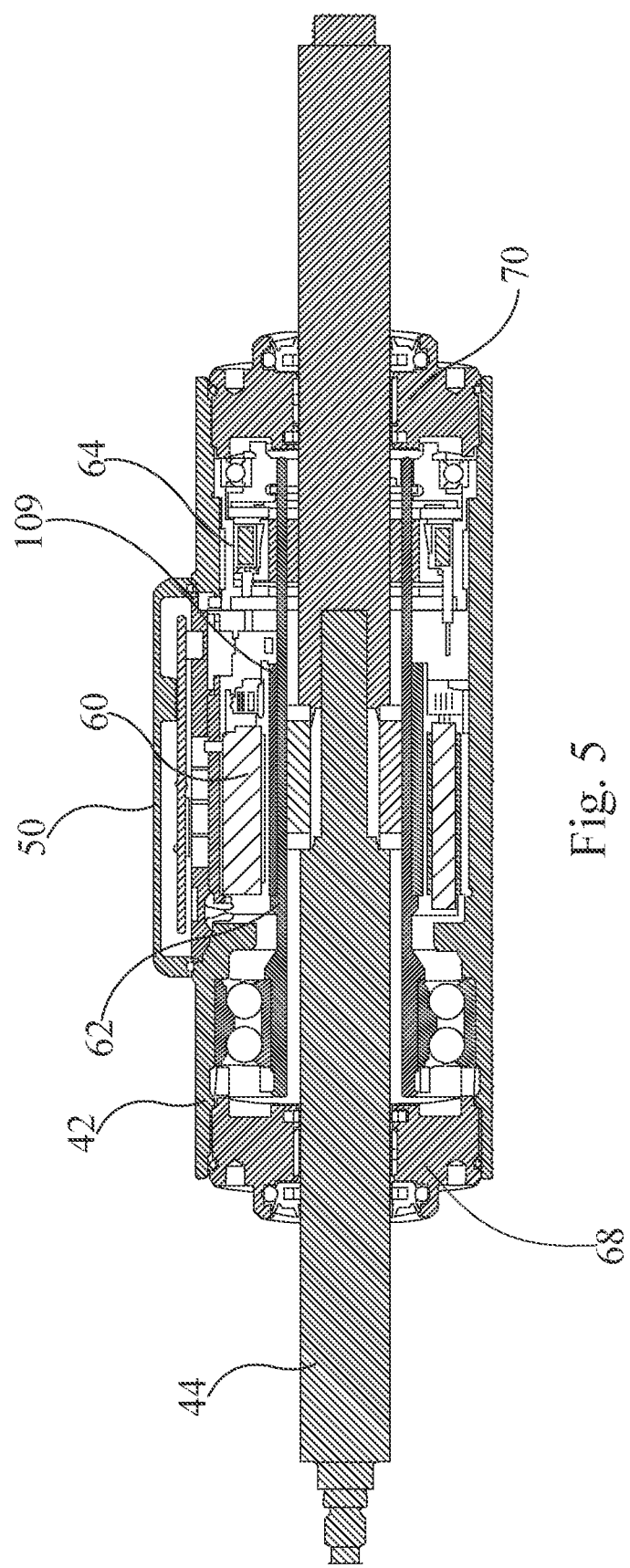
FIG. 5 is a longitudinal, sectional view of the electric actuator of FIGS. 2 and 3.
Figure 6:
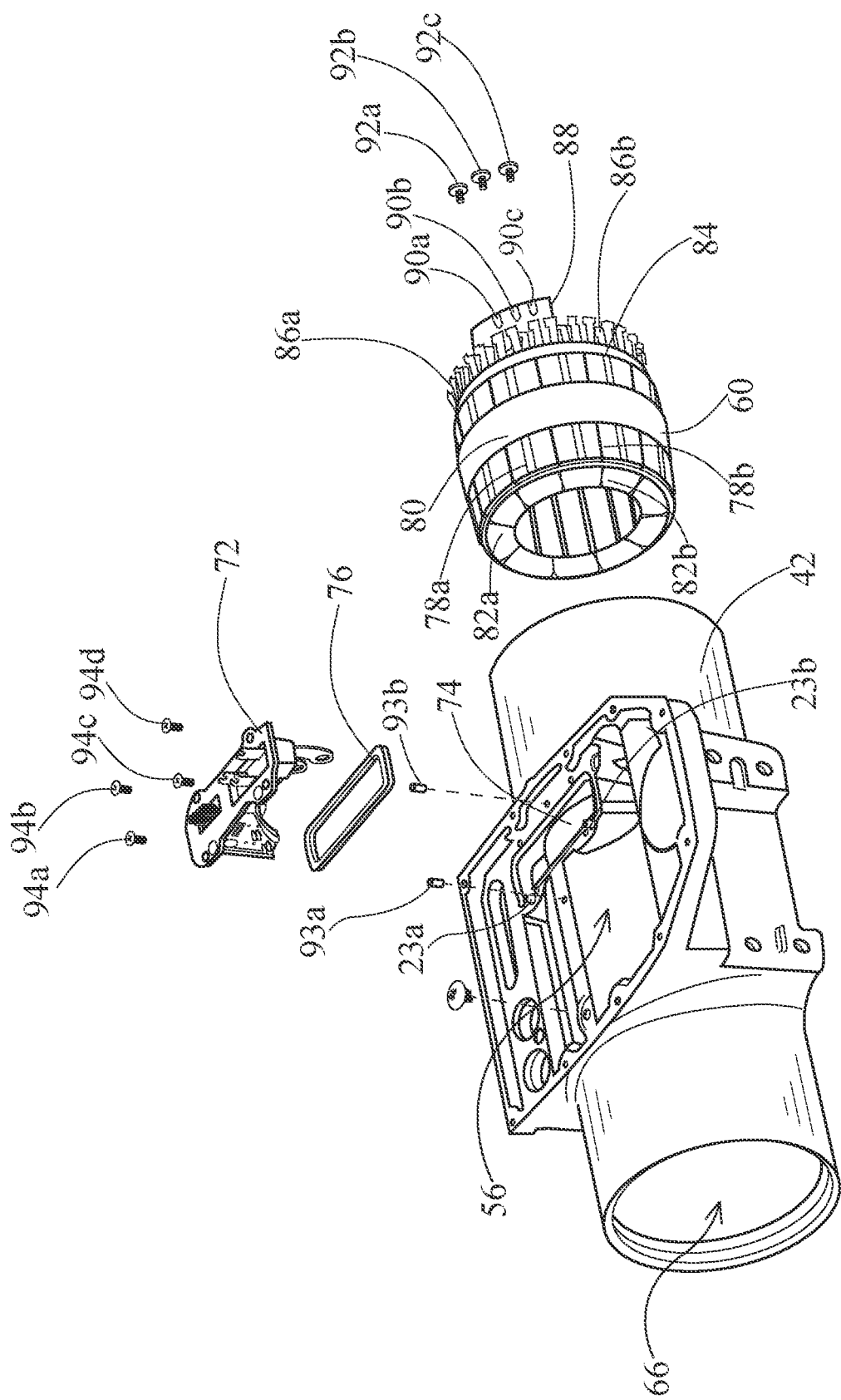
FIG. 6 is a fragmentary and exploded, perspective view of the electric actuator of FIGS. 2 and 3.

FIG. 4 is an exploded view of the electric actuator 40 and shows a cover 54 of the steering control unit 50 which covers electrical components within an interior 56 of the steering control unit 50 which is integral with the actuator housing 42 in this example. A gasket 58 is employed between the cover 54 and the interior 56 of the steering control unit 50 to seal the steering control unit 50 and the actuator housing 42. The electric actuator 40 further includes the following general components, namely, a stator 60, a rotor assembly 62, and a brake 64 which are disposed within an interior 66 of the housing 42 as best shown in FIG. 5. The housing 42 is sealed at opposite ends by an end gland 68 and an end gland 70. The electrical components of the steering control unit 50 are generally separated from the components disposed within the housing 42. However, with reference to FIG. 6, an electrical connector 72 extends through an opening 74 in the housing 42 to electrically connect the stator 60 to the steering control unit 50. A gasket 76 is employed about the electrical connector 72.

Figure 7:
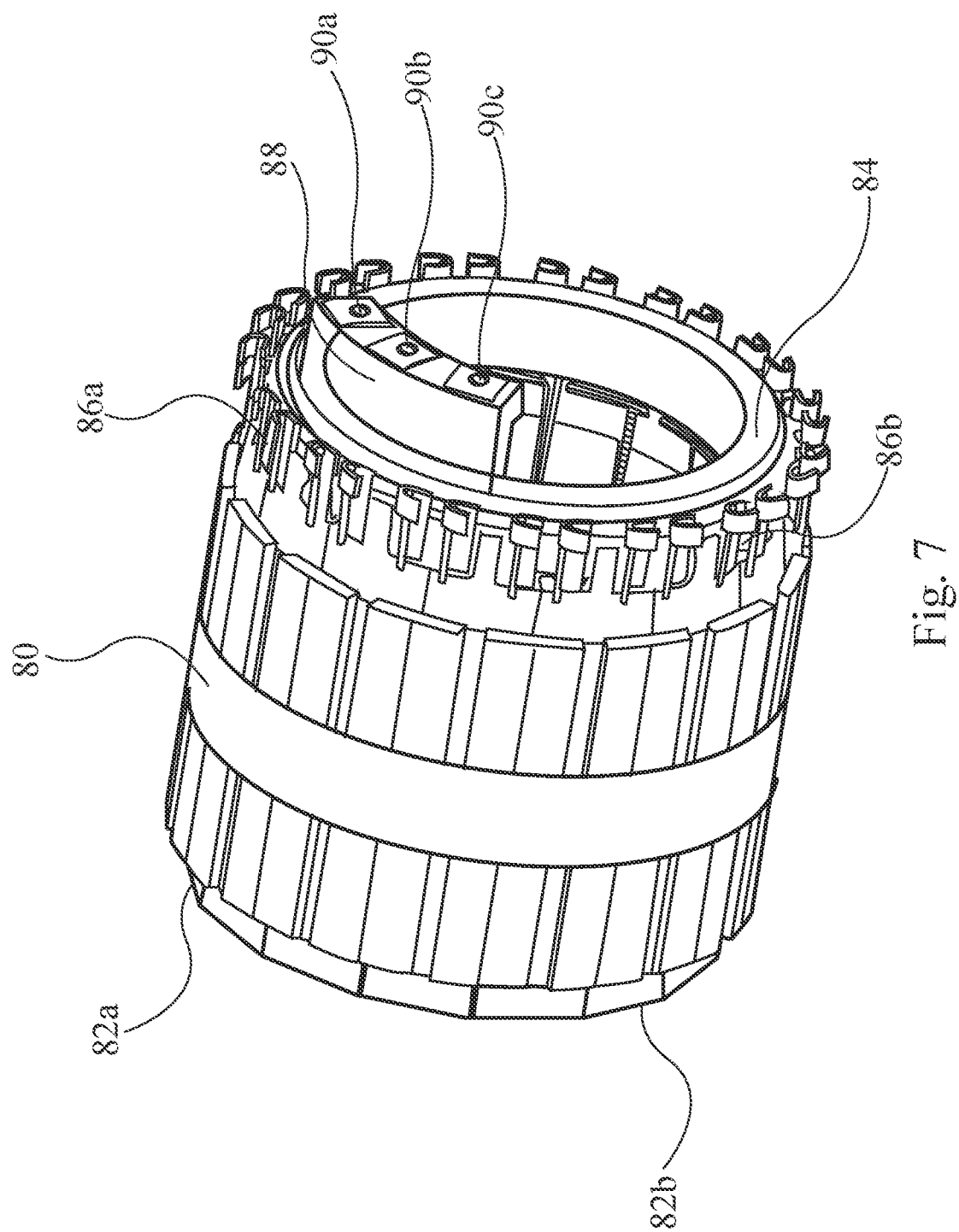
FIG. 7 is a perspective view of a stator of the electric actuator of FIGS. 2 and 3.

The stator 60 includes a plurality of segments, for example segments 78a and 78b, which are arranged in a generally annular formation and, in this example, are initially retained in the generally annular formation by a retaining ring 80. The segments 78a and 78b are received by the housing 42 and the retaining ring 80 is removed. The segments may then be retained in the generally annular formation in the housing 42 by potting about the stator with epoxy (not shown). The epoxy is sealed within the interior 66 of the housing 42 by the gasket 76. The segments may initially be arranged in the generally annular formation with play to allow the stator 60 to adjust to different sized housings. Each of the segments has a separate electrical winding coil, for example, coils 82a and 82b which are shown respectively for segments 78a and 78b. This arrangement allows for reduced end turns. The stator 60 also includes a lead frame 84, best shown in FIG. 7, with a plurality of openings, for example openings 86a and 86b, through which respective coils 82a and 82b are crimped and wired to the steering control unit 50 by the electrical connector 72. The lead frame 84 of the stator 60 also includes a portion 88 with a plurality of openings 90a, 90b, and 90c, shown in FIG. 7, which receive respective fasteners 92a, 92b, and 92c to allow for alignment and connection of the stator 60 with the electrical connector 72. The electrical connector 72 receives dowel pins 93a and 93b which allow for alignment of the stator 60 with the electrical connector 72. The electrical connector 72 also receives a plurality of fasteners 94a, 94b, 94c and 94d which hold the electrical connector in place. This arrangement separates electrical components within the interior 56 of the steering control unit 50 from the components within the interior 66 of the housing 42.

Figure 8A:
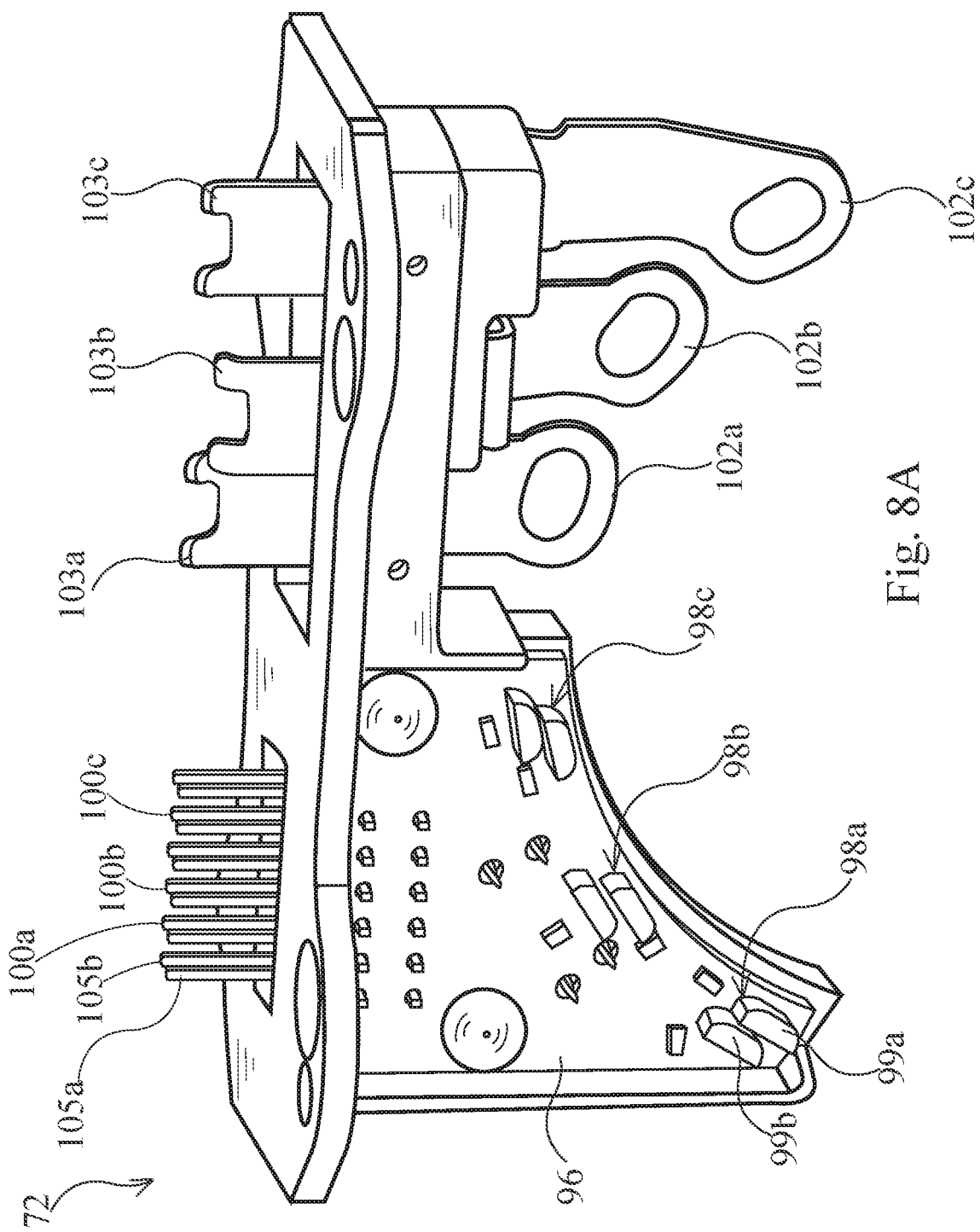
FIG. 8A is a perspective view of an electrical connector of the electric actuator of FIGS. 2 and 3.
Figure 8B:
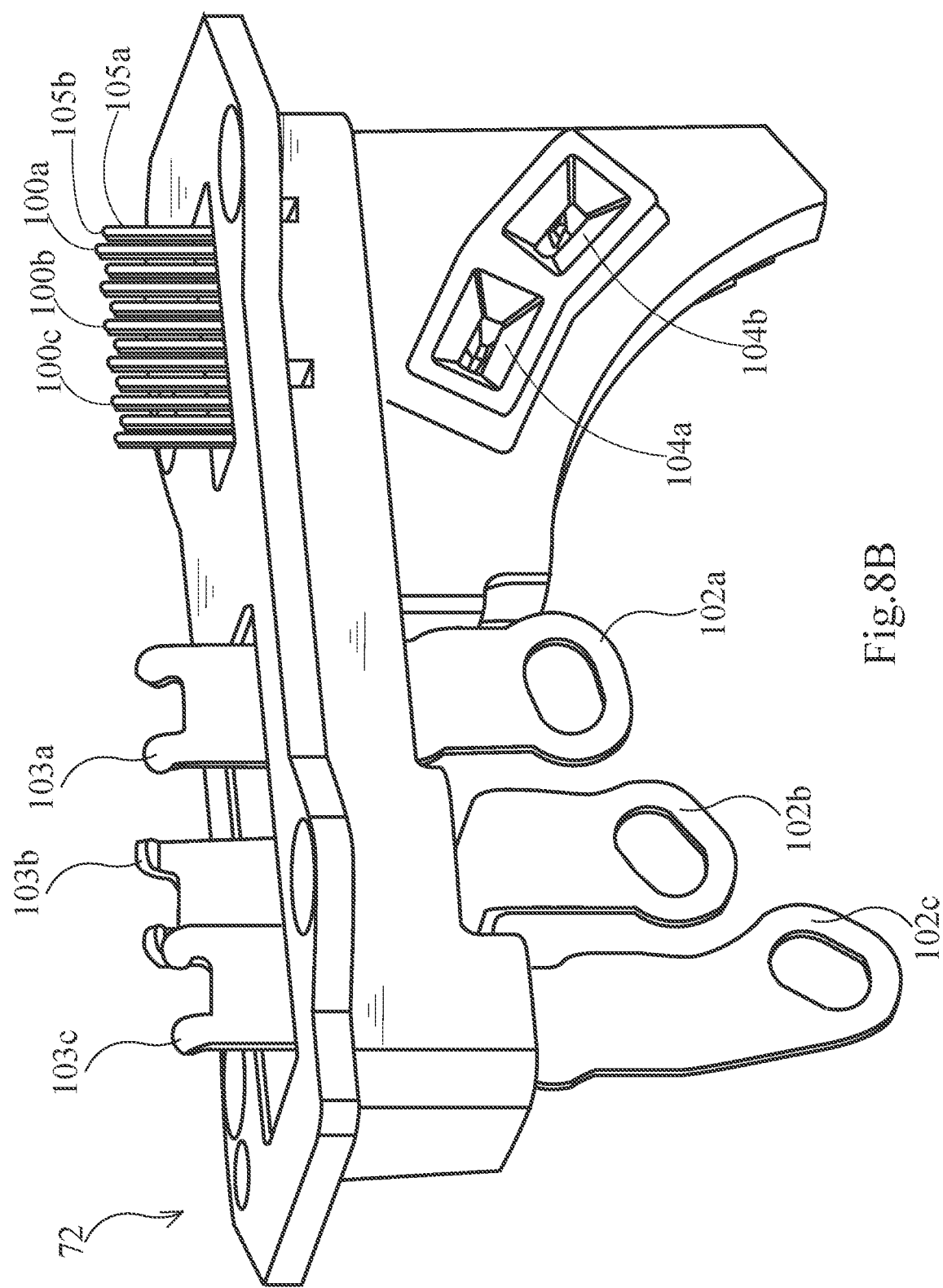
FIG. 8B is another perspective view of an electrical connector of the electric actuator of FIGS. 2 and 3.

The electrical connector 72 is shown in greater detail in FIGS. 8A and 8B. The electrical connector 72 has a commutation sensor board with sensors which, in this example, is a Hall Effect sensor board 96 with an array of Hall Effect sensors. There are three sets of Hall Effect sensors 98a, 98b, and 98c, in this example, because the electric actuator 40 has a three-phase electric motor. Alternating current fluctuates according to a curve from a positive to negative state over time. Each component of the three-phase current follows the same pattern but are spaced apart timewise. Each current phase uses all three sets of Hall Effect sensors. Each set of Hall Effect sensors 98a, 98b, and 98c is coupled to a respective one of Hall Effect sensor connections 100a, 100b and 100c. The electric connector 72 also has a plurality of motor connections 102a, 102b and 102c and corresponding motor pins 103a, 103b, and 103c as well as a plurality of brake connections 104a and 104b and corresponding brake pins 105a and 105b.

Figure 9:
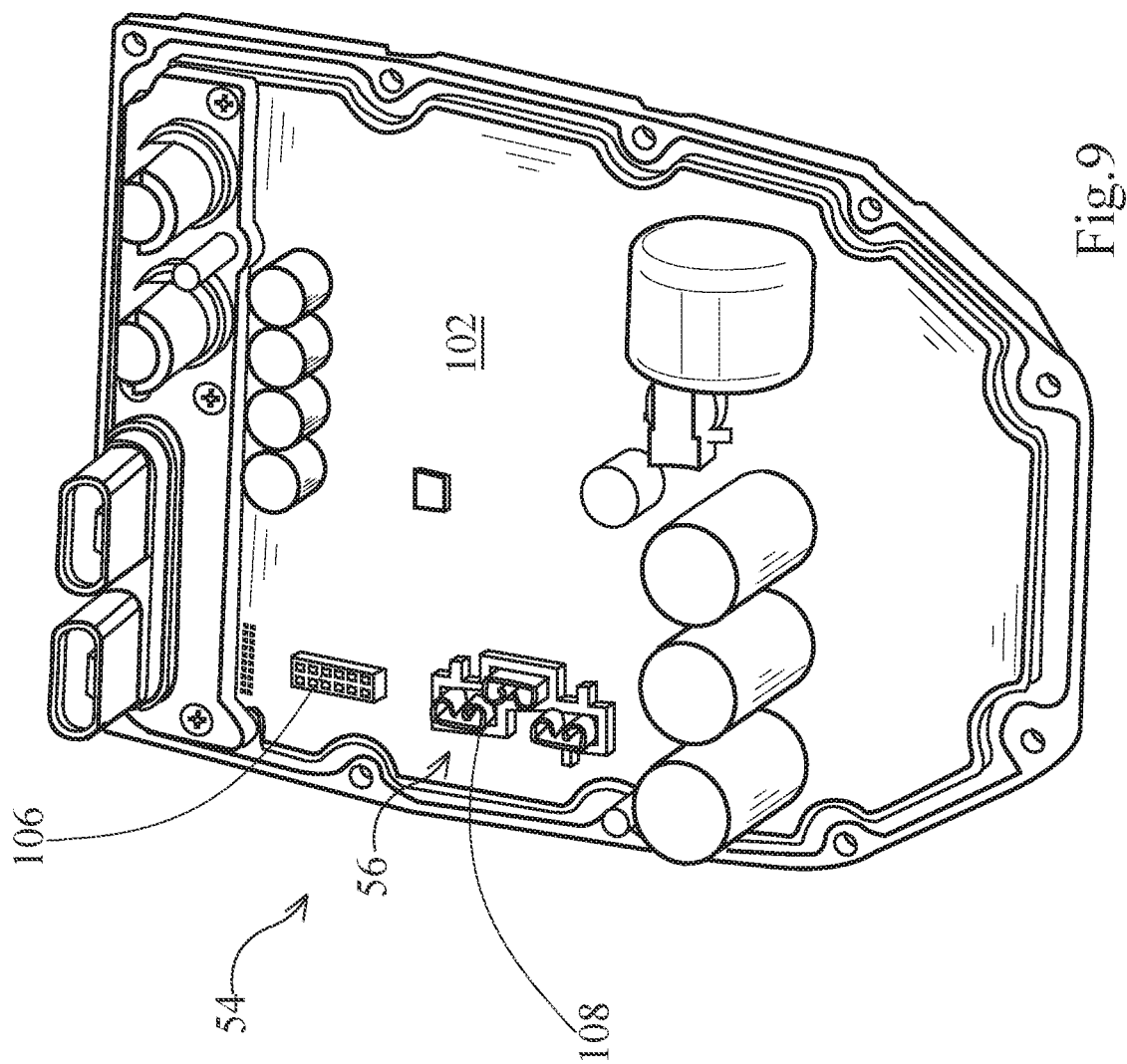
FIG. 9 is a plan view of an inside of a cover for a steering control unit of the electric actuator of FIGS. 2 and 3.
Figure 10:
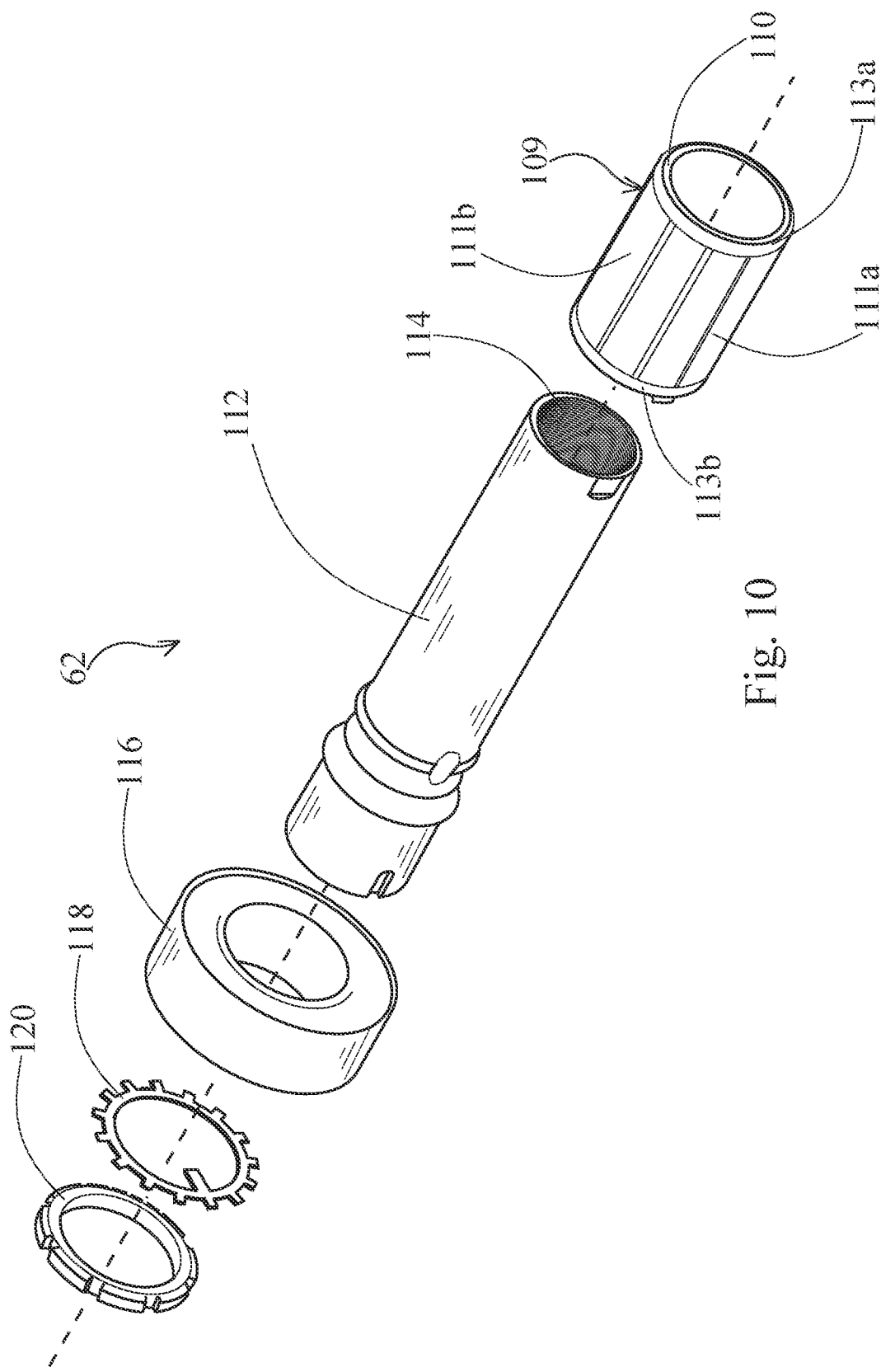
FIG. 10 is an exploded, perspective view of a rotor assembly for the electric actuator of FIGS. 2 and 3.

Referring now to FIG. 9, an inner side 102 of the cover 54 of the steering control unit 50 is provided with a first connection 106 and a second connection 108. The first connection 106 connects to the Hall Effect sensor connections 100a, 100b and 100c as well as the brake pins 105a and 105b. The second connection 108 connects to the motor connections 102a, 102b and 102c. The steering control unit 50 is thereby connected to the motor which includes the stator 60, the rotor assembly 62, and the Hall Effect sensor board 96. The rotor assembly 62 is best shown in FIG. 10 and includes a first rotor member 109 having a magnet sleeve 110 provided with a plurality of slots (not shown) which receive a plurality of magnets, for example magnets 111a and 111b, which are adhered to the magnet sleeve 110 in a generally annular formation. There are also retaining rings 113a and 113b that provide backup retention of the magnets 111a and 111b. The magnet sleeve 110 is mounted on a second rotor member 112 with an internally threaded bore 114. There is an angular contact bearing 116 that allows the rotor assembly 62 to rotate. There is also a lock washer 118 and a lock nut 120.

The Hall Effect sensor board 96 senses the relative position of the magnets 111a and 111b and is timed to the stator 60. The Hall Effect sensor board 96 is advanced timed in each direction. The stator 60 is accordingly powered by motor connections 102a, 102b and 102c such that the magnetic field generated is slightly in front of the rotational position of the magnets 111a and 111b and the magnetic field pulls the magnets 111a and 111b to rotate the rotor assembly 62. Each set of Hall Effect sensors 98a, 98b, and 98c on the Hall Effect sensor board 96, as called out for a first set of the Hall Effect sensors in FIG. 8A, has a first Hall Effect sensor 99a and a second redundant and offset Hall Effect sensor 99b. A first one of the Hall Effect sensors in each set of Hall Effect sensors 98a, 98b, and 98c is positioned for advanced timing in a first rotational direction and a second one of the Hall Effect sensors in each set of Hall Effect sensors 98a, 98b, and 98c is positioned for advanced timing in a second rotational direction. The first rotational direction and the second rotational direction are opposite and respectively correspond to opposite steering directions of the marine vessel 10 based on the rotation of the rotor assembly 62. The use of two different Hall Effect sensors in each set of Hall Effect sensors 98a, 98b, and 98c allows each set of Hall Effect sensors 98a, 98b, and 98c to "soak up" manufacturing tolerances while allowing advanced timing for the first rotational direction and the second rotational direction. Furthermore, if one of the Hall Effect sensors in any set of Hall Effect sensors 98a, 98b, and 98c fails then the other one of the Hall Effect sensors may function as a failsafe.

Figure 11:
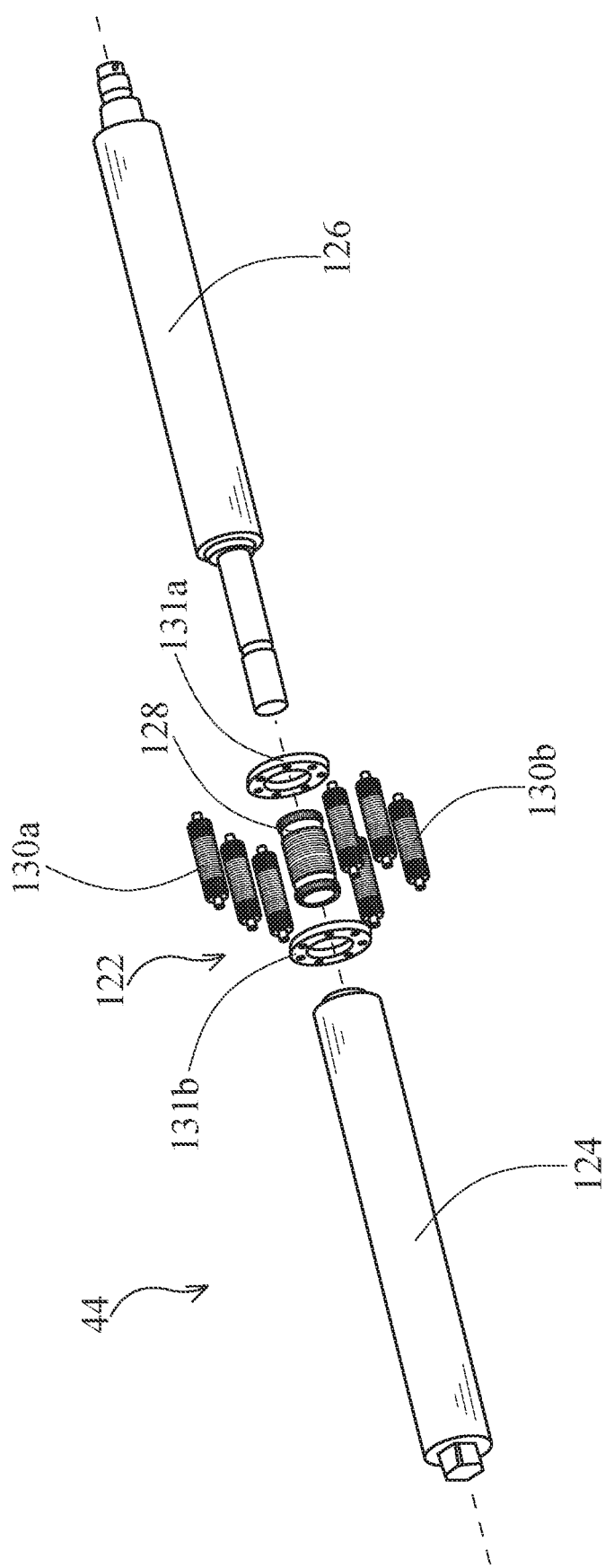
FIG. 11 is an exploded, perspective view of an output shaft for the electric actuator of FIGS. 2 and 3.

The rotor assembly 62, as shown in FIG. 5, receives the output shaft 44 which is shown in greater detail in FIG. 11 and, in this example, the output shaft 44 includes a roller screw assembly 122, a first shaft portion 124, and a second shaft portion 126. The roller screw assembly 122 has a central screw 128 and a plurality of rollers, for example, rollers 130a and 130b, which are able to rotate about the central screw in a planetary fashion but do not translate axially relative to the central screw 128. The rollers 130a and 130b are aligned by annular end plates 131a and 131b. The roller screw assembly 122 is received by the internally threaded bore 114 of the rotor assembly 62 which is shown in FIG. 10. Rotation of the rotor assembly 62 causes the output shaft 44, as shown in FIGS. 3 and 4, to reciprocate relative to the housing 42. When the electric actuator 40 is mounted on the port engine 12, axial movement of the output shaft 44 is inhibited relative to the marine vessel 10 while the housing 42 reciprocates linearly along the output shaft 44 and relative to the marine vessel 10. This relative linear movement of the housing 42 imparts a steering force to the tiller 46 of the port engine 12 and thereby causes the port engine 12 to be steered in a conventional manner. The output shaft 44 may also be rotated manually in an emergency by loosening a lock nut (not shown) which prevents rotation of the output shaft in normal operation.

Figure 12:
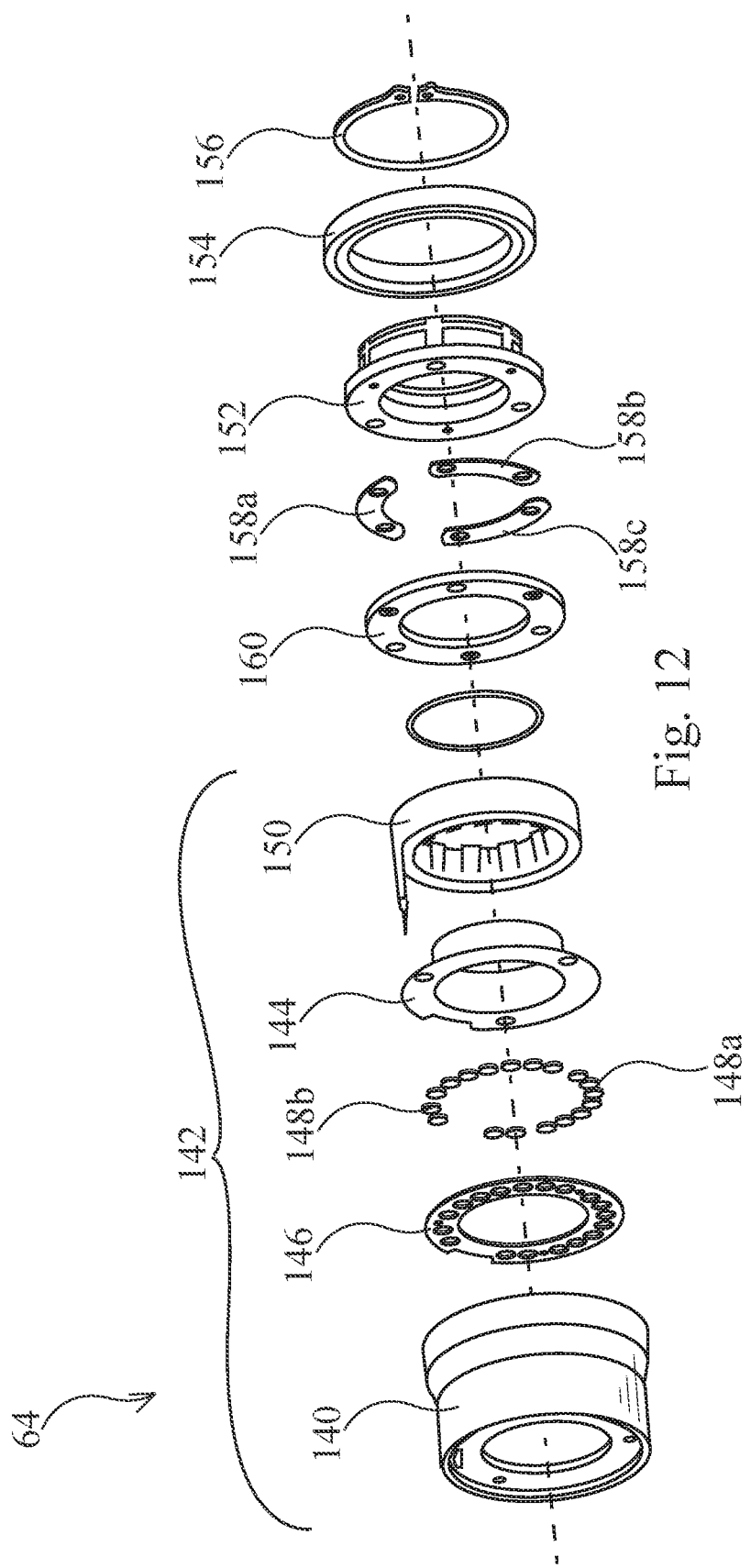
FIG. 12 is an exploded, perspective view of a brake for the electric actuator of FIGS. 2 and 3.

The brake 64 of the electric actuator 40 is shown in greater detail in FIG. 12. The brake 64 has an annular body 140 which houses an electromagnetic circuit 142. The electromagnetic circuit 142 includes a magnet retainer 144, a magnet holder 146 which holds a plurality of magnets, for example, permanent magnets 148a and 148b, and a brake coil assembly 150. The magnet retainer 144 retains the magnets and magnetic field. The magnet retainer 144, the magnet holder 146 and the permanent magnets 148a and 148b are shown in greater detail in FIG. 13. In other examples, there may be an annular magnetic ring. Referring back to FIG. 12, the brake 64 further includes a hub 152 which is press-fitted to a bearing 154. The bearing 154 is loose-fitted to the annular body 140. The bearing 154 holds the annular body 140 concentric to the hub 152. This allows the brake assembly 64 to align the rotor member 62 to the housing 42. The brake assembly 64 may be sub-assembled and tested as a module in production before integrating with the rotor member 62 and the housing 42. A retaining ring 156 acts as a backup retention. The bearing 154 allows the hub 152 to rotate with the rotor assembly 62. A plurality of flexures, for example arcuate flexures 158a, 158b, and 158c, are radially retained by and rotate with the hub 152. There is an annular brake pad 160 disposed between the electromagnet circuit 142 and the hub 152. The brake pad 160 is coupled to the hub 152 by the flexures 158a, 158b and 158c. The brake pad 160 therefore also rotates with the hub 152. The hub 152, the brake pad 160, and the flexures 158a, 158b, and 158c are shown in greater detail in FIG. 14.

FIGS. 15 and 16 show the coil assembly 150 disposed in an annular space or annulus 162 between the body 140 and the magnet retainer 144. The annulus 162 is larger in cross section than the coil assembly 150. This allows the coil assembly 150 to move within the annulus 162 so that a connector 164 of the coil assembly 150 may be aligned with the electrical connector 72 to connect with the brake connections 104a and 104b, shown in FIG. 8B, during assembly of the electric actuator 40. The movement of the coil assembly 150 within the annulus 162 may be rotary and/or radial movement. There is also an air gap 166 between the body 140 and the magnet retainer 144.

The permanent magnets 148a and 148b generate magnetic fields which pull the brake pad 160 to an engaged position against a first friction surface 168 and a second friction surface 170. In this example, the first friction surface 168 is a shoulder of the body 140 and the second friction surface 170 is an annular surface of the magnet retainer 144. The brake torque, or friction between the brake pad 160 and the first friction surface 168 and the second friction surface 170, is sufficient to prevent rotation of the hub 152 which is torsionally coupled to the rotor assembly 62. The brake 64 is accordingly normally in an engaged position, as shown in FIGS. 15 and 16, until the coil assembly 150 is energized to actuate the brake pad 160 to a released position.

FIGS. 17 and 18 show the brake 64 in the released position, when the coil assembly 150 is energized, and the coil assembly 150 generates a magnetic field which is sufficient to redirect the magnetic field generated by the permanent magnets 148a and 148b. This allows the flexures 158a, 158b, and 158c to bias the brake pad 160 away from the first friction surface 168 and the second friction surface 170 to the released position. There is a brake pad stop 172 which, in this example, is an annular lip of the hub 152 that restricts movement of the brake pad 160 away from the first friction surface 168 and the second friction surface 170 when the brake 64 is in the released position so the hub 152 can rotate freely. The brake pad stop 172 sets a maximum distance of the brake pad 160 from the first friction surface 168 and the second friction surface 170 when the brake 64 is in the released position. The maximum distance is set to allow the brake 64 to re-engage.

The coil assembly 150 is energized by receiving an electric current. However, in this example, the brake 64 is only actuated to the released position if a current supplied to the coil assembly 150 is between a first threshold current and a second threshold current. The first threshold current may be, for example, about 0.6 amps and the second threshold current may be about 1.2 amps, or the first threshold current may be about 0.8 amps and the second threshold current may be about 1.0 amps. This ensures consistent release of the brake 64 within the design limits of the current draw.

The air gap 166 between the body 140 and the magnet retainer 144 sets brake strength and current thresholds when the brake is in the released position. This minimizes the electric current required to move the brake to the released position while maintaining a desired minimum brake torque. The brake torque may be lower than an output torque of the motor of the electric actuator 40. This allows the motor of the electric actuator 40 to override the brake 64 in the event of brake failure. The brake torque may be greater than a back driving torque. This allows the brake 64 to restrict movement of the output shaft 44 in the event of motor failure. This also allows the brake to restrict movement of an engine mounted on a marine vessel which is important during trailering of the marine vessel.

The brake 64 may also be provided with an H-bridge in the steering control unit for reversing the polarity of the voltage supplied to the coil assembly 150. This increases the speed at which the brake 64 is actuated from the released position to the engaged position. This also increases the brake torque. There is an O-ring 174 which mates against the rotor assembly to provide rotational dampening. There is also a support ledge 176 on the body 140 of the brake 64 which minimizes thermal expansion of the brake 64.

The end gland 68 is shown in greater detail in FIGS. 19 to 21. The end gland 68 includes an annular body 178. The annular body 178 receives a floating seal housing 180 and a bushing 182. The bushing 182 is disposed between an inner seal 184 and an outer seal 186. The inner seal 184 is provided with an inner seal energizer 188 and the outer seal 186 is provided with an outer seal energizer 190. The outer seal 186 and the outer seal energizer 190 are received by a groove 192 in the seal housing 180. There is a seal, in this example, an O-ring 194 disposed between the annular body 178 and the seal housing 180. The O-ring 194 sits on a concave wall 198 of the seal housing 180. This centers the O-ring 194 relative to the floating seal housing 184. The seal housing 180 is provided with a first radial lip 200 and a second radial lip 202. The first radial lip 200 is resilient and facilitates the installation of the seal housing 180 in the end gland 68. The second radial lip 202 has a sharp edge which functions as a scraper for scraping debris from the output shaft 44 and also provides stability and output shaft tracking. The sealing housing 180 is also provided with a chamfer 204 which facilitates the installation of the O-ring 194. A back wall 206 of the seal housing 180 is flush with the annular body 178 for stability. A back heel 208 of the seal housing 180 is concentric with the output shaft 44 and is formed of a rigid low wear material. The O-ring 194 allows the seal housing 180 to move radially when subjected to loads against the output shaft 44. This reduces wear of the second radial lip 202 and back heel 208 of the seal housing 180.

Figure 22:
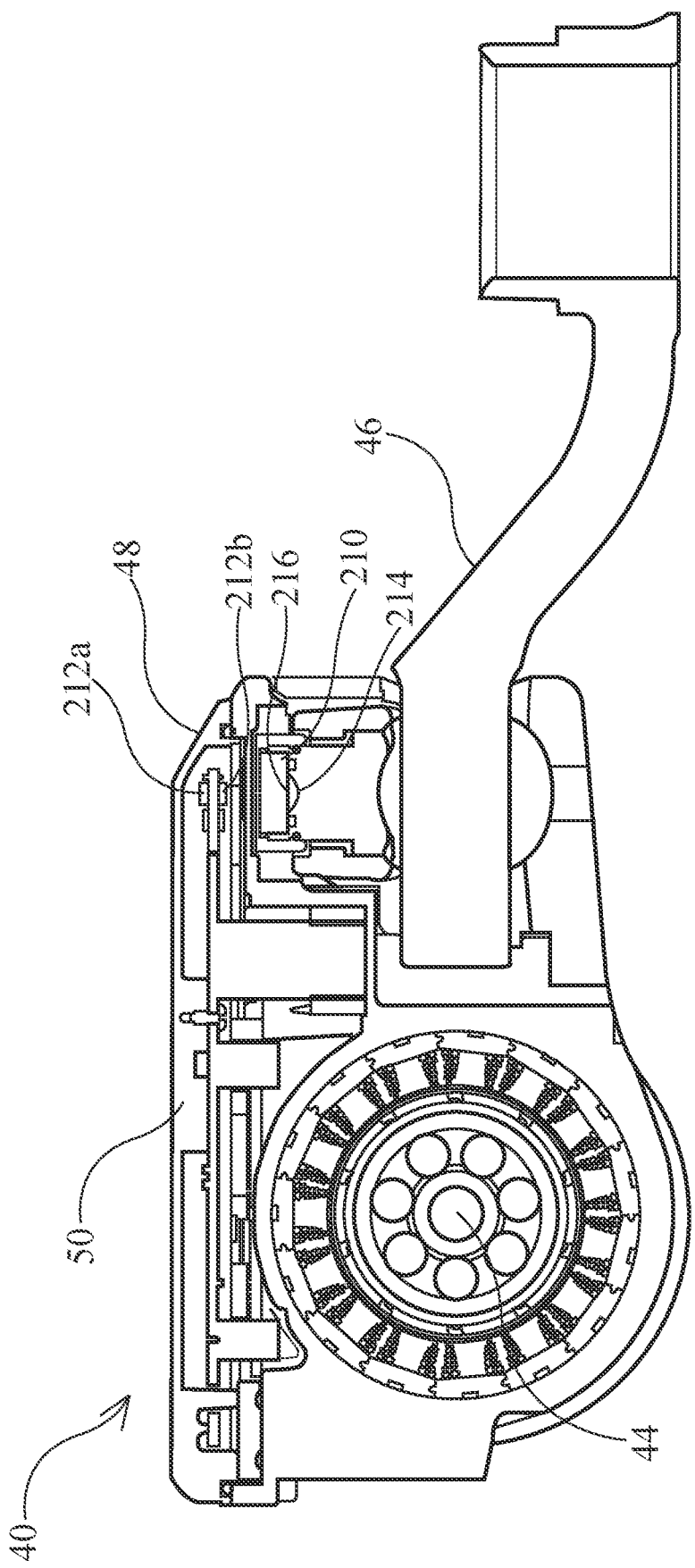
FIG. 22 is a cross-sectional view taken across line 22-22 of FIG. 2.

FIG. 22 shows the electric actuator 40 coupled to the tiller arm 46. There is a magnetic position target 210 mounted on the coupling assembly 48 and absolute position sensors 212a and 212b mounted on the electric actuator 40 within the steering control unit 50. The absolute position sensors 212a and 212b sense a steering position based on a position of the magnetic position target 210. The steering position may be referred to as the steering angle. The steering control unit 50 and the absolute position sensors 212a and 212b move axially relative to the output shaft 44 when steering motion is imparted to the tiller arm 46. The coupling assembly 48 and magnetic position target 210 rotate when steering motion is imparted to the tiller arm 46. The coupling assembly 48 has a curved surface 214 which drives a curved surface 216 of the magnetic position target 210. The curved surface 214 and the curved surface 216 allow a rotational degree of freedom in the direction of the output shaft 44 axis to handle potential rotational misalignment due to manufacturing tolerances and external loading.

Figure 23:
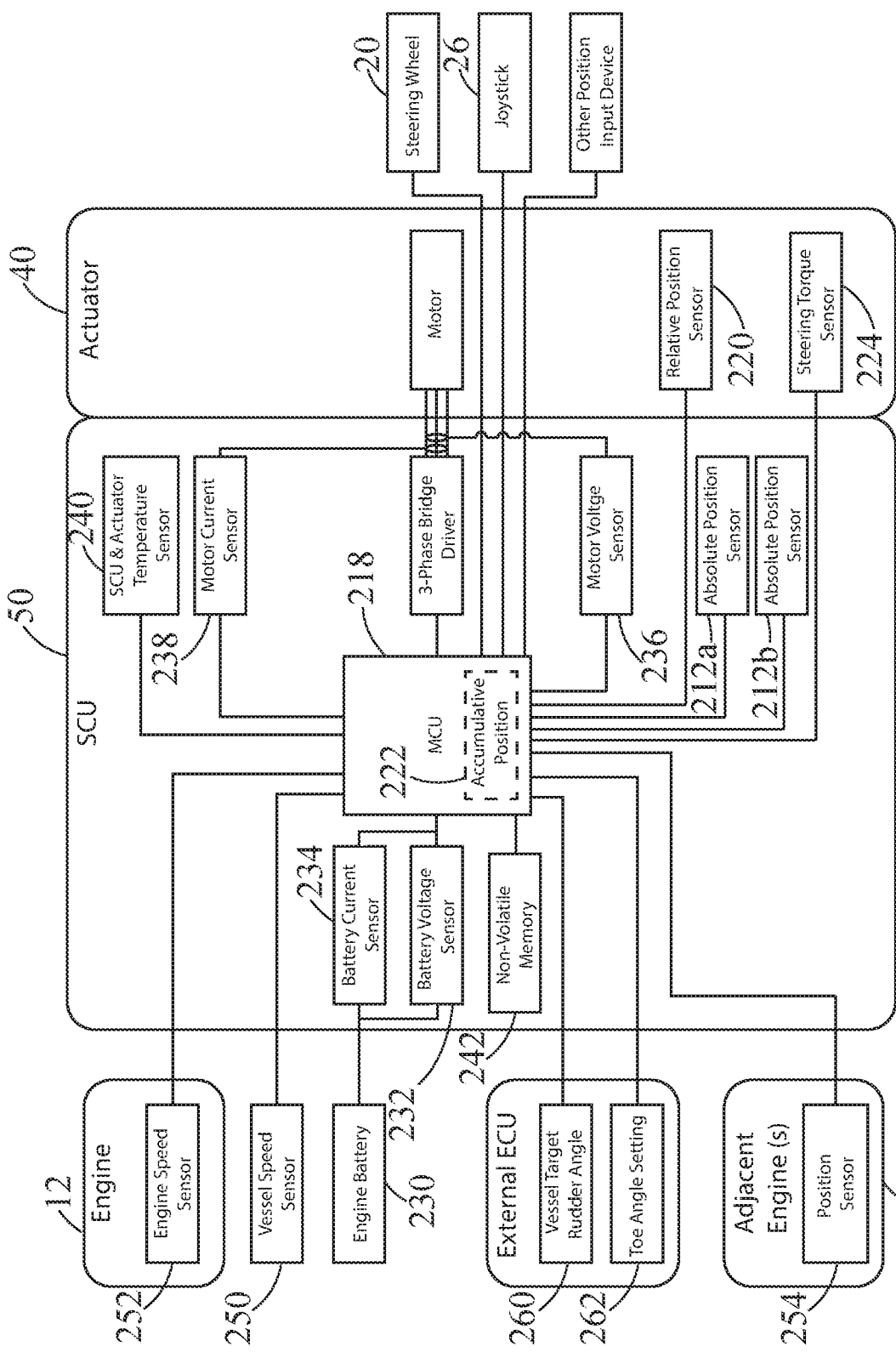
FIG. 23 is a block diagram of the steering control unit of the electric actuator of FIGS. 2 and 3.

The absolute position sensors 212a and 212b signal the steering position to a microcontroller 218 disposed within the steering control unit 50 as shown in FIG. 23. There is also a relative position sensor 220 which signals a position of the motor (M) to the microcontroller 218. The absolute position sensors 212a and 212b are in the form of anisotropic magnetoresistance sensors, in this example, and the relative position sensor 220 is a Hall Effect Sensor, in this example, but any suitable absolute position sensor and relative position sensor may be used. The relative position sensor 220 may be one or more of the Hall Effect sensors on the Hall Effect sensor board shown in FIG. 8A. The steering control unit 50 calibrates an accumulative position using multiple points through the actuator stroke based on the relationship between the absolute position sensors 212a and 212b and the absolute position sensors. This map for the accumulative position is stored in a non-volatile memory 242. This initializes an accumulative position which signals an accumulative steering position to the microcontroller 218 and then accumulates relative position as the actuator 40 moves over time.

Figure 24:
FIG. 24 is a schematic showing the initialization logic of a sensing method employed by the electric actuator of FIGS. 2 and 3.

The accumulative position is initialized at start-up, as shown in FIG. 24, and preferably when the motor and brake are not enabled. This allows for a high initialization accuracy of the accumulative position. Backlash can be measured by comparing a signal of the accumulative position and a signal of the absolute position sensors 212a and 212b at a single steering position after the steering position is approached from both sides. Backlash is primarily imposed at the interface between the tiller and the actuator, along the steering axis, where the absolute position sensors 212a and 212b are disposed. There is minimal backlash imposed along the output shaft axis where the relative position sensor 220 is disposed. The steering control unit 50 monitors backlash during initial steering movement to determine whether there has been significant steering movement to take up the backlash. The steering control unit 50 compares a value of the absolute position sensors 212a and 212b to determine a magnitude of the backlash. The steering control unit 50 then compensates for the backlash by reinitializing the accumulative position. The steering control unit 50 may restrict the steering range to take up the backlash and, after the backlash has been compensated for, allow the full steering range. The steering control unit 50 may also store the measured backlash in non-volatile memory 242 to monitor the change of backlash over time. The information stored in the non-volatile memory can be used to provide warning or service reminder. If the backlash has exceeded an allowable safety threshold, then the steering control unit 50 may reduce the performance of the actuator.

The use of a combination of the absolute position sensors 212a and 212b together with the relative position sensor 220 results in a triple redundancy in which each sensor is compared with the other sensors for fault detection. In this example, the steering control unit 50 compares a signal of the absolute position sensors 212a and 212b to the accumulative position for fault detection. The use of additional absolute position sensors and relative position sensors to provide additional accumulative positions will result in multiple redundancies based on the number of sensors used. For example, and with reference to FIG. 23, a motor voltage sensor 236 may measure back EMF waveforms of the stator phase, as the motor commutates, to determine a relative position of the motor. This allows the steering control unit 50 to use the motor voltage sensor as an additional relative position sensor.

Figure 25:
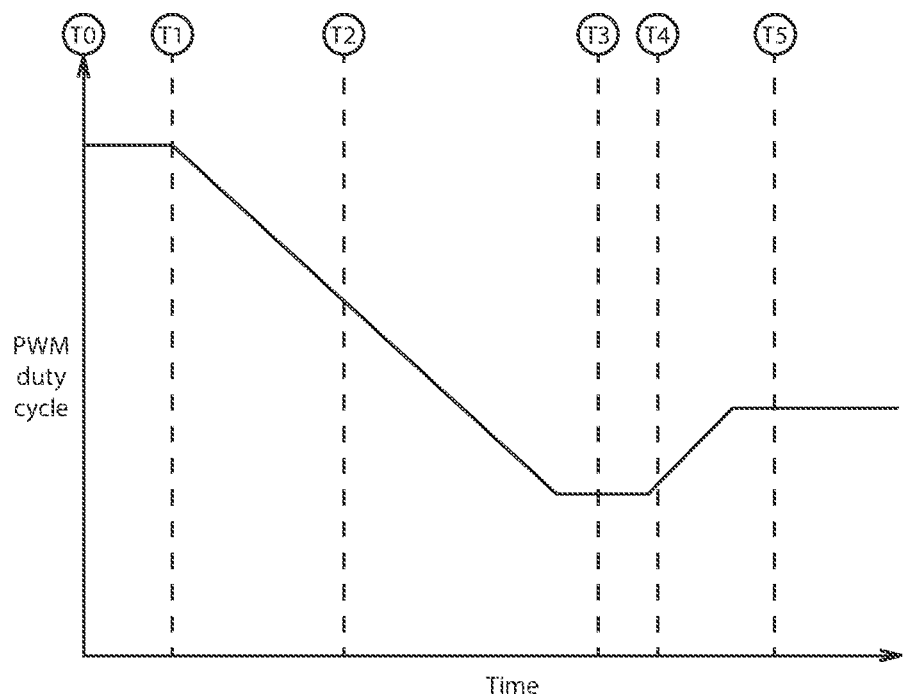
FIG. 25 is a graph showing PWM duty cycle as a function of time when the steering control unit energizes the stator to align the magnetic field of the stator with the magnetic field of the rotor in the electric actuator of FIGS. 2 and 3.

The steering position is continuously monitored by the steering control unit 50 and a PID position closed loop control is employed to minimize steering position error as is conventional. The steering control unit 50 energizes the stator 60 to generate a magnetic field 226 that is ahead of a magnetic field 228 of the rotor 62 which results in a rotating torque. This is conventional motor operation called commutation. The steering control unit 50 stops advancing the phase commutation once the steering position error has been minimized to a desired threshold error. The steering control unit 50 then energizes the stator 60 to align the magnetic field 226 of the stator 60 with the magnetic field 228 of the rotor assembly 62, as shown in FIGS. 25 to 28. The steering control unit 50 selects one of the three phases of the three-phase alternating current to apply the holding PWM. This is best shown in FIG. 25 which is a graph showing a PWM duty cycle applied to the stator 60 as a function of time.

The description above describes the accumulative position being initialized at startup, and reinitialized again after initial steering movement to compensate for backlash. However, it is understood that the steering control unit 50 may choose to delay the initialization if certain initialization conditions are not met, or reinitialize again after certain specific trigger events. For example, after a failed sensor has recovered during operation.

Figure 26:
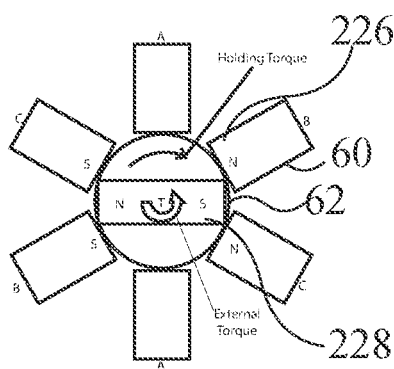
FIG. 26 is a schematic showing the stator and a stationary rotor when the holding torque is greater than or equal to the external torque that is being applied to the electric actuator of FIGS. 2 and 3.
Figure 27:
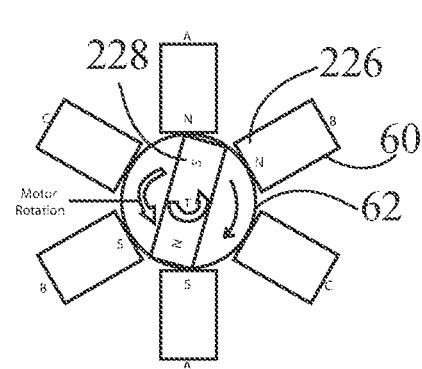
FIG. 27 is a schematic showing the stator and a back driving rotor when a holding torque is less than the external torque that is being applied to the electric actuator of FIGS. 2 and 3.
Figure 28:
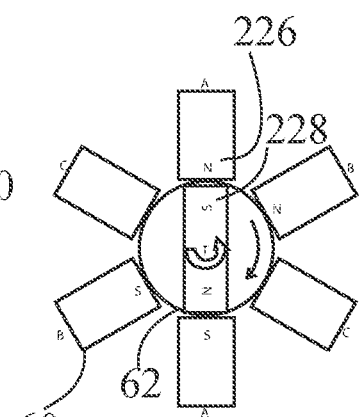
FIG. 28 is a schematic showing the stator and a stopping rotor when the holding torque has been increased to counter the external torque that is being applied to the electric actuator of FIGS. 2 and 3.
Figure 29:
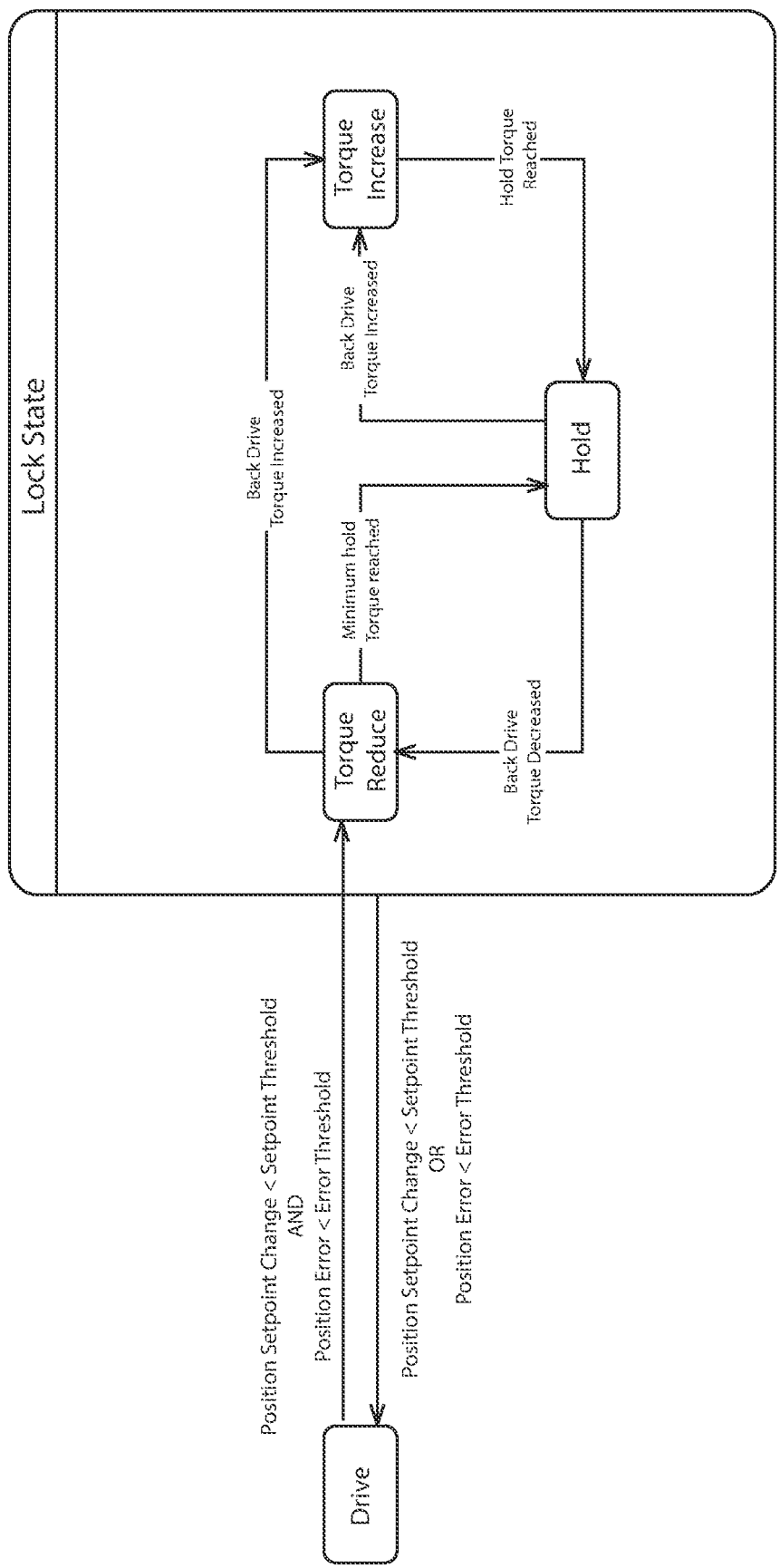
FIG. 29 is a state diagram showing the states of the steering control unit as the steering control unit controls the holding torque to hold the position of the actuator of FIGS. 2 and 3.

Referring now specifically to FIG. 25 and, with reference to states shown in FIG. 29, the steering control unit 50 is in a drive state between time T0 and time T1 during which the steering control unit 50 applies a PWM so there is commutation. The desired steering position is reached at time T1 and the steering control unit transitions to a hold state during which the steering control unit applies a holding PWM. The steering control unit 50 applies a holding PWM by applying a positive PWM and current to a first phase of the three-phase current and a negative PWM and current to a second phase of the three-phase current. The holding PWM is relatively high when first applied at time T1 but is reduced at a controlled rate, during a torque reduce state through time T2, until a minimum holding PWM is reached at time T3 to restrict back driving in a hold state. The holding PWM creates a holding torque that counteracts the back driving torque, i.e. holds a position of the rotor assembly 62. The holding torque can be larger than the back driving torque without causing motor rotation. FIG. 26 shows the holding torque opposing the back driving torque. The steering control unit 50 may set a minimum holding PWM as a function of at least one of marine vessel speed, engine RPM, and steering position. Referring back to FIG. 23, the marine vessel speed may be sensed by a marine vessel speed sensor 250 and the engine RPM may be sensed by an engine speed sensor 252.

However, back driving torque is directly proportional to rudder load and rudder load is a function of propeller torque, vessel dynamic, engine mounting configuration, rudder angle, engine speed, and marine vessel torque. The back driving torque may therefore fluctuate significantly especially during a turn and/or at high speeds. The back driving torque may therefore become greater than the holding PWM and holding torque which results in back driving. The phase can be changed to maintain the holding torque opposing the external torque and stop motor rotation. The steering control unit 50 monitors back driving according to the state diagram shown in FIG. 29 and transitions the torque increases state. The minimum holding PWM may therefore be increased at a controlled rate, during a torque increase state starting at time T4, until the back driving torque is less than or equal to the holding PWM and back driving has stopped at time T5 and return to the hold state. There may also be a steering torque sensor 224 which senses steering torque. The steering control unit 50 may determine a magnitude and rate of PWM increase based on a signal from the steering torque sensor 224 which senses back driving torque. The steering control unit 50 may also determine a magnitude and rate of PWM increase based on a signal from the position sensor 220 which may sense back driving.

The holding PWM should preferably be minimized to a level that is sufficient to create a holding torque which counters the back driving torque, but not higher than necessary to avoid inefficiencies in current consumption. The minimum holding PWM may also be adaptively increased based on engine speed. This minimizes actuator position error and current draw to reduce the chances of engine overheating.

Referring back to FIG. 23, in this example, there is a power source in the form of a battery 230 which supplies electric power to the actuator 40. There are sensors, a voltage sensor 232 and a current sensor 234 in this example, which sense a state of the battery 230. The voltage sensor 232 and/or the current sensor 234 may sense a capacity of the battery 230. The voltage sensor 232 and/or the current sensor 232 may signal the microcontroller 218 regarding the capacity of the battery 230 and the steering control unit 50 limits the maximum electric power supplied to the motor by controlling the voltage to the motor relative to the capacity of the battery 230.

Figure 30:
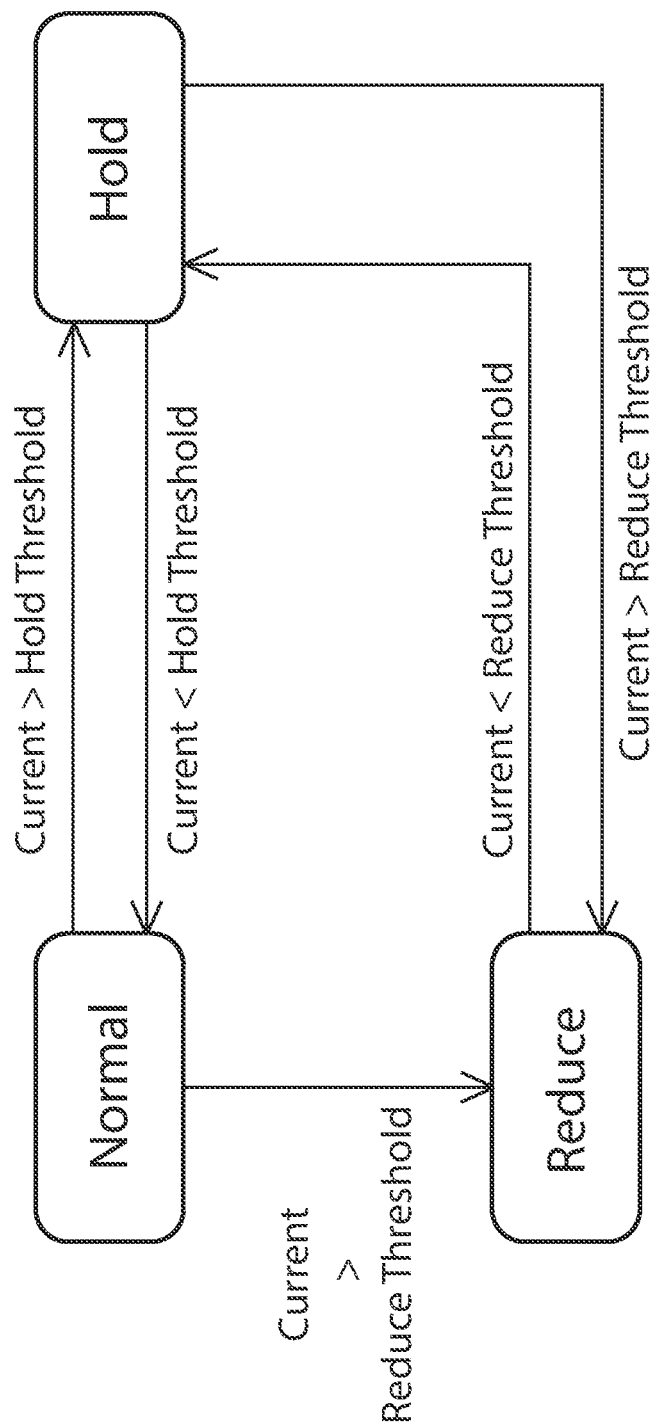
FIG. 30 is a block diagram showing the logic of the current limiting method employed by the electric actuator of FIGS. 2 and 3.

Battery current draw may be limited by employing a three zone current limiting scheme as shown in FIG. 30. The three zone current limiting scheme uses a PWM limit to control the maximum PWM that can be applied to the motor. The steering control unit can provide any PWM up to the maximum PWM. The PWM limit is decreased by a predefined slew rate in a Reduce Zone. The purpose of the Reduce Zone is to reduce and limit the battery current below an allowable threshold. The PWM is allowed to increase and decrease according to a slew rate controlled PWM command in a Normal/Recovery Zone. The purpose of the Normal/Recovery Zone is to allow the PWM to recover back to normal level and follow the PWM command. The PWM limit is prevented from increasing in a Hold Zone but the PWM may be decreased in the Hold Zone. The purpose of the Hold Zone is to hold or slow down current increase by preventing the PWM from increasing. The Hold Zone reduces battery current oscillations and excessive voltage drops. This increases maximum battery current output. FIG. 30 is a block diagram showing the logic of the current limiting method.

Figure 31:
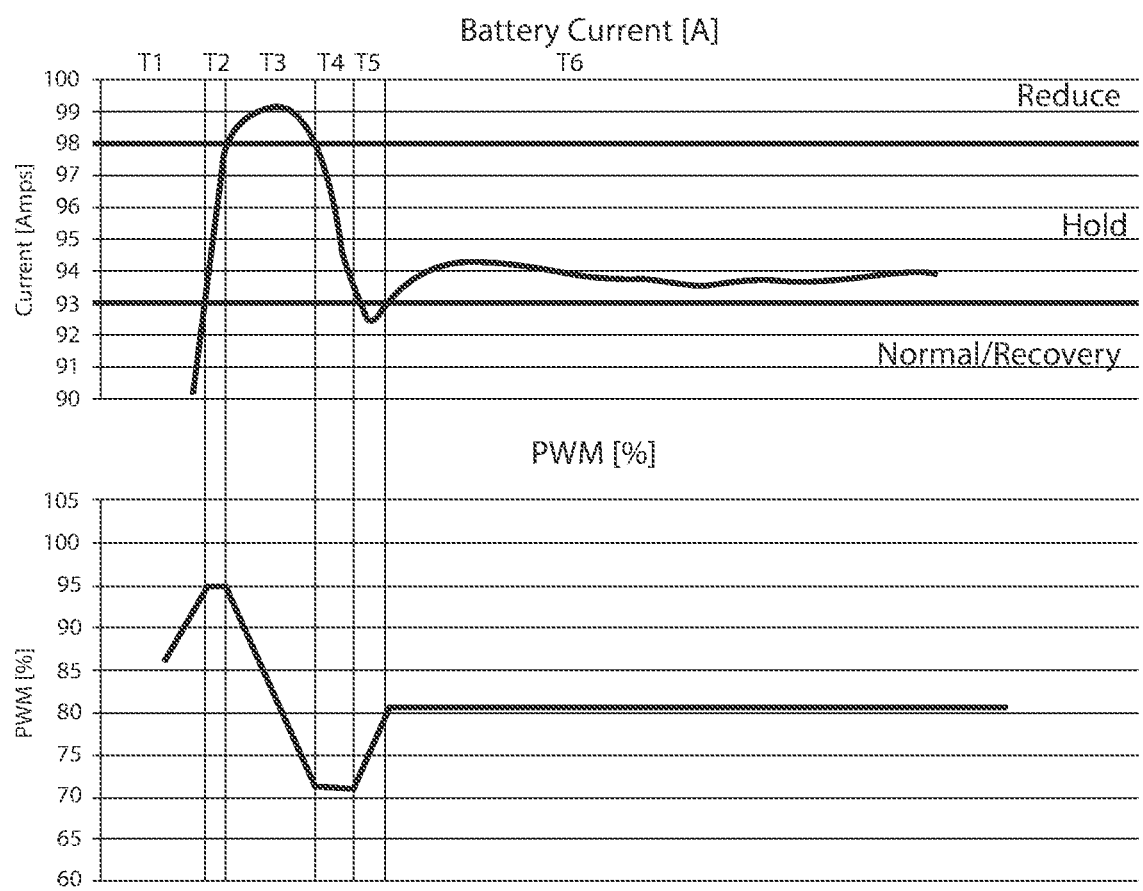
FIG. 31 is a graph showing a three zone current limiting scheme for the electric actuator of FIGS. 2 and 3.

The zones of the three zone current limiting scheme may be based on the battery current as shown, for example, in FIG. 31. The Reduce Zone is when the battery current is greater than 98 amps. The Normal/Recovery Zone is when the battery current is less than 93 amps. The Hold Zone is when the battery current is between 93 amps and 98 amps. FIG. 31 also shows an example of the three zone current limiting scheme being employed. The PWM and battery current is allowed to increase in the Normal/Recovery Zone during time period T1. The PWM is held steady in the Hold Zone during time period T2. The PWM decreases in the Reduce Zone during time period T3. This results in a drop in motor voltage ($V_m$) and, a drop in motor current drop leads to a drop in battery current ($I_B$), which achieves the goal of battery current limit. The battery current ($I_B$) continues to drop as a result of the sharp torque and current ripple during time period T4. The PWM however remains constant. When the battery current ($I_B$) reaches the Normal/Recovery Zone, during time period T5, the PWM increases slightly until the PWM and battery current stabilize in the Hold Zone in time period T6.

Figure 32:
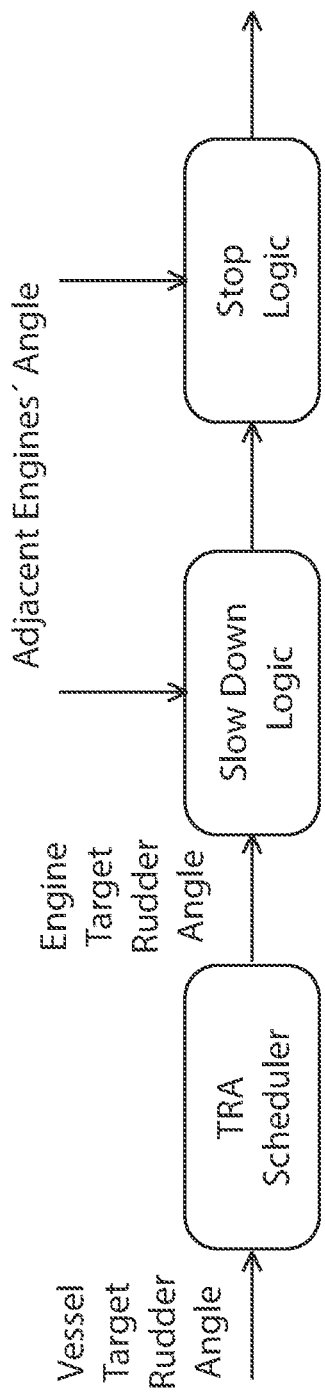
FIG. 32 is a block diagram showing the logic of a three stage process to prevent engine collision employed by the actuator of FIGS. 2 and 3.
Figure 33:
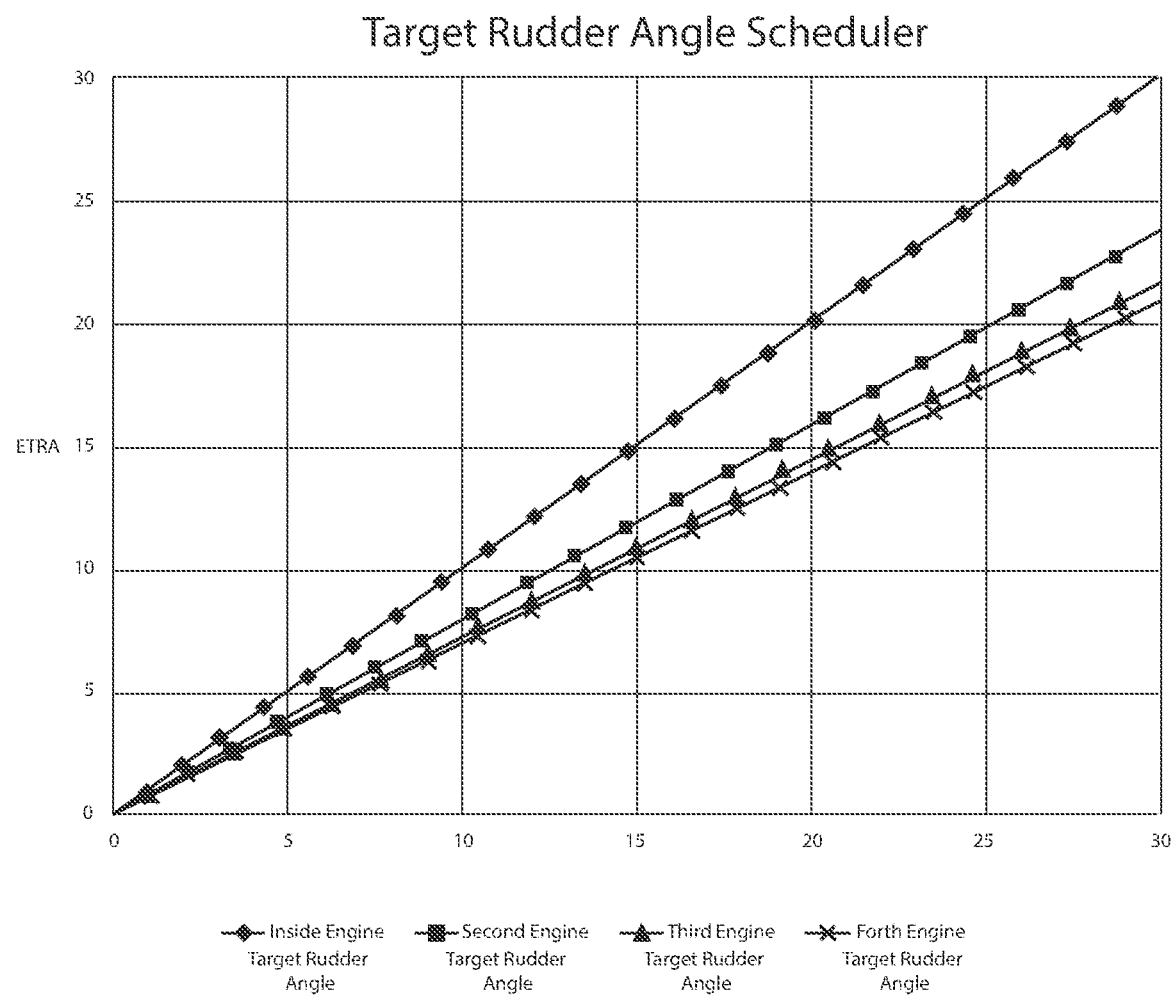
FIG. 33 is a graph showing a target actuator position scheduler for the propulsion units of the marine vessel of FIG. 1.

The steering control unit 50 may also employ a three stage process to reduce engine speed and a pause actuator movement to prevent engine collision as shown in FIG. 32. Each of the engines has its own engine target rudder angle position scheduler, as shown in FIG. 33, which is generated during a scheduler step. The engine target rudder angle schedule is based on a vessel target rudder angle steering position command. When all engines operate on their respective engine target rudder angle schedules there should be no engine collision as the scheduler is defined by collision points which themselves are defined by engine geometry, distances between engines, and steering angles.

Figure 34A:
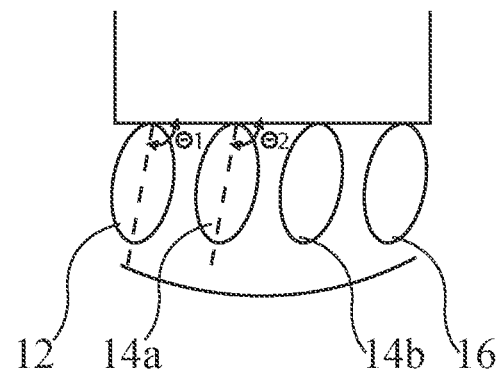
FIGS. 34A and 34B are schematics showing the port engine slowing down due to a load and the port center engine slowing down to prevent engine collision.
Figure 34B:
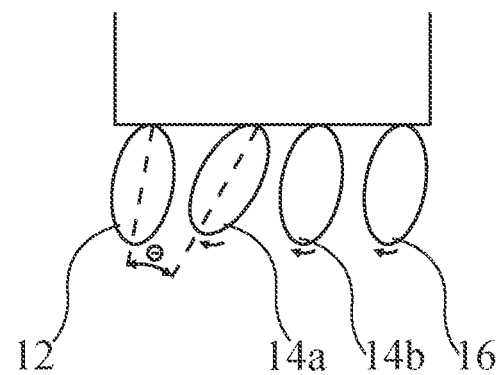

However, a given engine may experience more load and may slowdown as shown in FIGS. 34A and 34B. In FIG. 34A the engines are starting to turn and the port engine 12 and the inner port engine 14a operate on their respective scheduler there should be no engine collision as the schedulers have the same engine target rudder angle Θ. However, in FIG. 34B the port engine 12 slows down due to a load. There is accordingly a slowdown step which includes ratiometric slowing down of the inner port engine 14a in response to a separation distance between a slowdown line and a pause line shown in FIG. 35.

Figure 35:
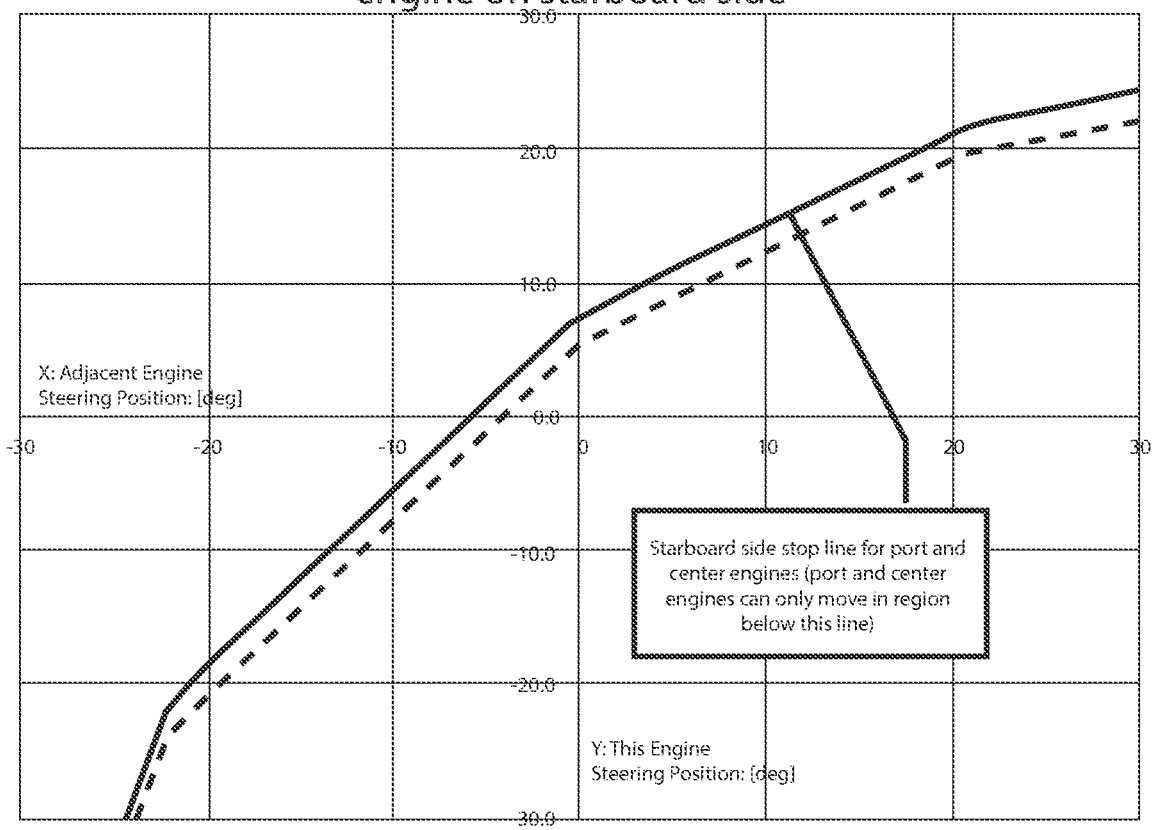
FIG. 35 is a graph showing a pause line of an engine and slow down line of an engine relationship with an adjacent engine of the marine vessel of FIG. 1.

FIG. 35 shows a pause line of an engine and slow down line relationship with an adjacent engine on the starboard side. The Y-axis is a steering position of the engine and the X-axis is a steering position of the adjacent engine. The steering control unit 50 uses the map to determine where to slow down and pause steering movement of the engine. For example, if the adjacent engine is the starboard engine, and the steering position of the adjacent engine is at 30°, the port side engine can only travel to 22° before it has to slow down, and travel to 24° before it has to pause steering. However, if the same port engine is steering towards port direction, there is no restriction to slow down or pause steering. The inner port engine 14a slows down relative to the steering position of the port engine 12. There is also a pause step in which a brake of the actuator or the holding PWM is applied to restrict movement of the actuator.

Figure 36:
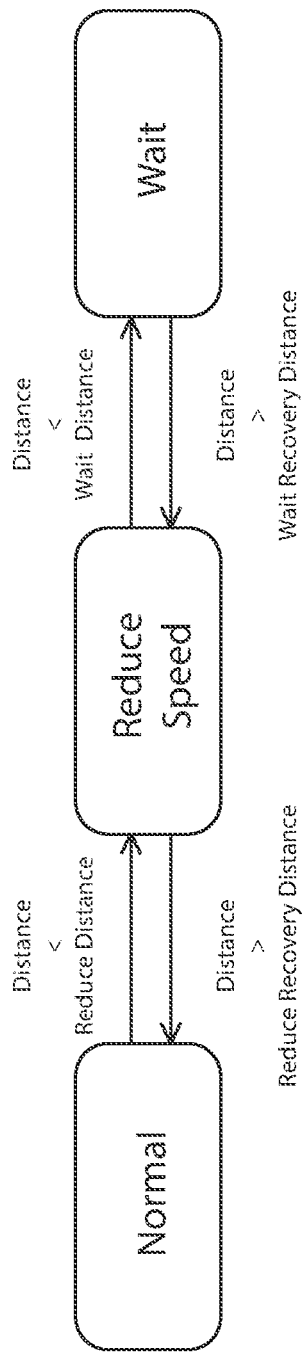
FIG. 36 is a state diagram of the three stage process to prevent engine collision employed by the electric actuator of FIGS. 2 and 3.

The leading engines and the following engines exhibit different behaviours and only the following engines will reduce engine speed and stop actuator movement. The steering control unit 50 monitors the position of its respective engines as well as the relative position of adjacent engines in order to reduce engine speed and stop actuator movement as the engines come close to the target actuator positions. Referring back to FIG. 23, for example, the steering control unit 50 may determine the relative position of the engines based on the absolute sensors 212a and 212b and relative sensor 220, as described above, or the steering control unit 50 may determine the relative position of the engines based on a position sensor 254 of the adjacent engine. FIG. 36 shows that the steering control unit operates the actuator in three states. There is a Normal State in which the actuator is allowed to operate up to a maximum speed without restriction. There is a Reduce Speed State in which the actuator is allowed to operate up to a maximum speed limit determined by a reduce speed curve. The maximum speed limit is also direction dependent in the Reduce Speed State. There is a Wait State in which the actuator is prevented from moving further in a first direction. However, the actuator is allowed to move in a second direction which is opposite to the first direction in the Wait State.

The distance between adjacent engines is used to trigger the transition between the Normal State, the Reduce Speed State, and the Wait State. The distance at which to transition back to a state that allows a higher maximum speed can be the same or larger than the distance to transition to the lower state. If there is no adjacent actuator on a given side, the actuator will always be in this state when moving towards that side. This three stage process allows for smaller separation distance between engines which allows more engines to be mounted on a marine vessel.

Figure 37:
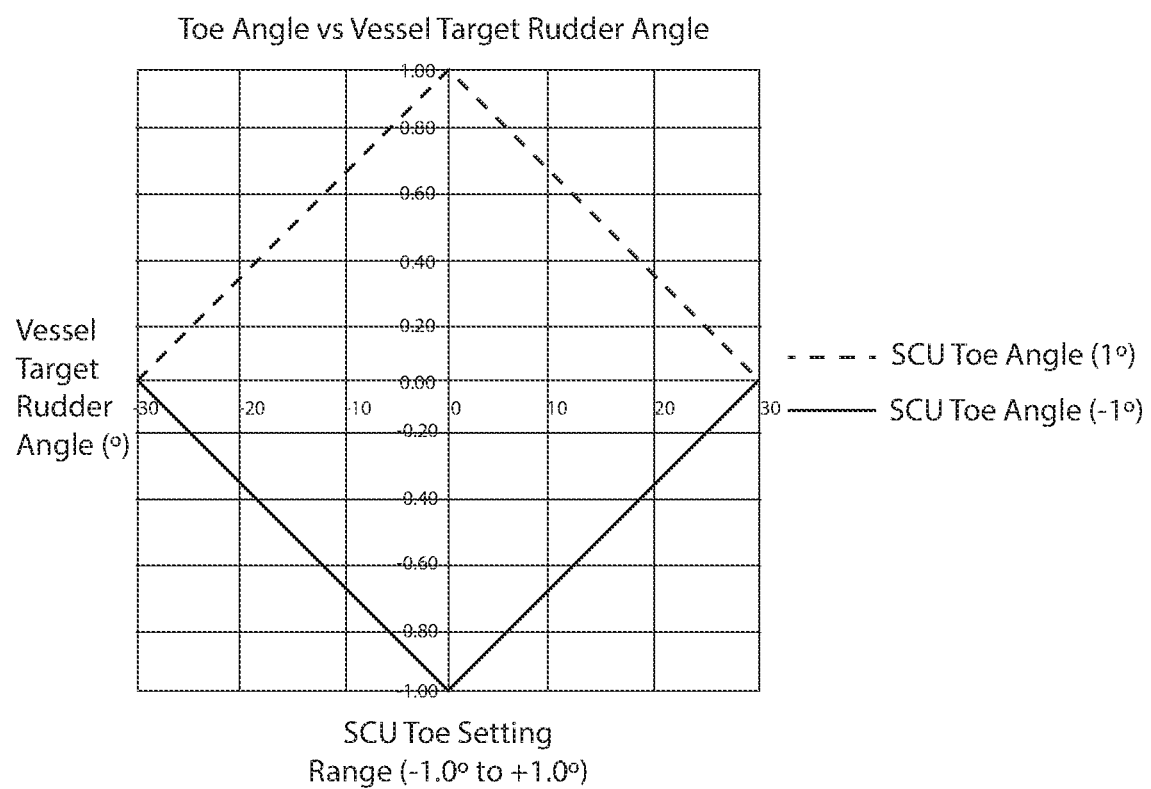
FIG. 37 is a variable toe angle diagram of the three stage process to prevent engine collision employed by the electric actuator of FIGS. 2 and 3.

FIG. 37 is a variable toe diagram showing that a toe angle logic of the steering control unit 50 is vessel target rudder angle 260 dependant. The toe angle 262 is at its maximum value and equal to the toe setting when vessel target rudder angle is 0°. In this example, the toe angle modifies the engine target rudder angle for each engine, and ratiometrically reduce to a minimum toe value at the two hardstops (i.e. vessel target rudder angle=+/−30°. In this example, the minimum toe value is defined as 0° at hardstop. A negative toe angle indicates toe in, and a positive toe angle indicates toe out. This is beneficial especially for big engines with small separation distance. For those systems at hardover steering, a non-zero toe value will reduce the steering range for the outer engines in a turn, and thus may affect steering performance such as turn radius. However, in other examples, other parameters may be used.

It will be understood by a person skilled in the art that many of the details provided above are by way of example only, and are not intended to limit the scope of the invention, which is to be determined with reference to the following claims.

What is claimed is:

1. An actuator for imparting steering movement to a tiller of a propulsion unit of a marine vessel, the actuator comprising:
    a housing;
    an output shaft reciprocatingly received by the housing;
    a motor operable to cause the output shaft to reciprocate relative to the housing;
    an absolute position sensor operable to sense a steering position;
    a relative position sensor operable to sense a position of the motor; and
    a steering control unit operable to calibrate the relative position sensor based on a signal of the absolute position sensor, wherein calibration of the relative position sensor based on the signal of the absolute position sensor initializes an accumulative position which accumulates a relative position as the actuator moves over time.

2. The actuator as claimed in claim 1, wherein the steering control unit is further operable to compare the signal of the absolute position sensor and the accumulative position for fault detection.

3. The actuator as claimed in claim 1, wherein the steering control unit is further operable to initialize the accumulative position of the relative position sensor with the absolute position sensor when the actuator is started-up.

4. The actuator as claimed in claim 1, wherein the steering control unit is further operable to monitor the accumulative position and the steering position during a change in steering direction to determine backlash.

5. The actuator as claimed in claim 1, wherein the steering control unit is further operable to monitor backlash during initial steering movement and to compensate for backlash by reinitializing the accumulative position.

6. The actuator as claimed in claim 1, wherein the steering control unit is further operable to restrict a steering range of the actuator after initialization of the accumulative position and before compensating for backlash.

7. The actuator as claimed in claim 1, wherein the steering control unit is further operable to use the accumulative position for position control of the actuator.

8. The actuator as claimed in claim 1, wherein the steering control unit is further operable to use a redundant sensor for position control of the actuator if the absolute position sensor or the relative position sensor fails.

9. A marine steering system, comprising:
    a propulsion unit having a tiller; and
    an actuator for imparting steering movement to the tiller of the propulsion unit, the actuator including:
        a housing;
        an output shaft reciprocatingly received by the housing;
        a motor operable to cause the output shaft to reciprocate relative to the housing;
        an absolute position sensor operable to sense a steering position;
        a relative position sensor operable to sense a position of the motor; and
        a steering control unit operable to calibrate the relative position sensor based on a signal of the absolute position sensor, wherein calibration of the relative position sensor based on the signal of the absolute position sensor initializes an accumulative position which accumulates a relative position as the actuator moves over time.

10. The marine steering system as claimed in claim 9, wherein the steering control unit is further operable to compare the signal of the absolute position sensor and the accumulative position for fault detection.

11. The marine steering system as claimed in claim 9, wherein the steering control unit is further operable to initialize the accumulative position of the relative position sensor with the absolute position sensor when the actuator is started-up.

12. The marine steering system as claimed in claim 9, wherein the steering control unit is further operable to monitor the accumulative position and the steering position during a change in steering direction to determine backlash.

13. The marine steering system as claimed in claim 9, wherein the steering control unit is further operable to monitor backlash during initial steering movement and to compensate for backlash by reinitializing the accumulative position.

14. The marine steering system as claimed in claim 9, wherein the steering control unit is further operable to restrict a steering range of the actuator after initialization of the accumulative position and before compensating for backlash.

15. The marine steering system as claimed in claim 9, wherein the steering control unit is further operable to use the accumulative position for position control of the actuator.

16. The marine steering system as claimed in claim 9, wherein the steering control unit is further operable to use a redundant sensor for position control of the actuator if the absolute position sensor or the relative position sensor fails.

17. A marine steering system, comprising:
    an actuator for imparting steering movement to a tiller of a propulsion unit, the actuator comprising:
        a housing;
        an output shaft reciprocatingly received by the housing;
        a motor operable to cause the output shaft to reciprocate relative to the housing;
        an absolute position sensor operable to sense different steering positions of the propulsion unit;
        a relative position sensor operable to sense actuation by the motor; and
        a steering control unit operable to compare (a) one of the different steering positions of the propulsion unit according to the absolute position sensor to (b) an accumulative position accumulated according to signals received from the relative position sensor when the absolute position sensor senses the propulsion unit in the one of the different steering positions.

18. The marine steering system as claimed in claim 17, wherein:
    the steering control unit is further operable to identify an initial accumulative position according to a map of (a) a plurality of the different steering positions of the propulsion unit according to the absolute position sensor and (b) for each one of the plurality of the different steering positions of the propulsion unit according to the absolute position sensor, a respective measurement of actuation by the motor according to the relative position sensor when the absolute position sensor senses the propulsion unit in the one of the plurality of the different steering positions; and the accumulative position is accumulated, starting from the initial accumulative position, according to the signals received from the relative position sensor.

19. The marine steering system as claimed in claim 17, wherein the steering control unit is further operable to:

measure backlash by comparing accumulative positions accumulated according to signals received from the relative position sensor when the propulsion unit approaches, from opposite sides, a single steering position according to the absolute position sensor; and reinitialize the initial accumulative position to compensate for the backlash.

20. The marine steering system as claimed in claim 17, further comprising:

the propulsion unit comprising the tiller; and a joint coupling the housing to the tiller.

* * * * *